(12) United States Patent
Braun et al.

(10) Patent No.: US 8,094,028 B2
(45) Date of Patent: Jan. 10, 2012

(54) RADIO FREQUENCY ALIGNMENT OBJECT, CARRIAGE AND ASSOCIATED METHOD OF STORING A PRODUCT ASSOCIATED THEREWITH

(75) Inventors: Patrick Braun, Pittsburgh, PA (US); Manoj Wangu, Wexford, PA (US); Bruce Thompson, Pittsburgh, PA (US)

(73) Assignee: McKesson Automation, Inc., Cranberry, PA (US)

( * ) Notice: Subject to any disclaimer, the term of this patent is extended or adjusted under 35 U.S.C. 154(b) by 289 days.

(21) Appl. No.: 12/342,749

(22) Filed: Dec. 23, 2008

(65) Prior Publication Data

US 2009/0167500 A1 Jul. 2, 2009

Related U.S. Application Data

(60) Provisional application No. 61/017,298, filed on Dec. 28, 2007.

(51) Int. Cl.
*G08B 13/14* (2006.01)

(52) U.S. Cl. .................. 340/572.8; 340/572.1; 206/467

(58) Field of Classification Search .............. 340/572.1, 340/539.13, 539.22, 5.3, 568.1, 10.1, 572.8; 206/470; 700/236, 243, 244; 235/492, 385
See application file for complete search history.

(56) References Cited

U.S. PATENT DOCUMENTS

| | | | |
|---|---|---|---|
| 4,717,042 A | 1/1988 | McLaughlin | |
| 4,785,969 A | 11/1988 | McLaughlin | |
| 4,847,764 A | 7/1989 | Halvorson | |
| 5,014,875 A | 5/1991 | McLaughlin et al. | |
| 5,190,185 A | 3/1993 | Blechl | |
| 5,314,243 A | 5/1994 | McDonald et al. | |
| 5,346,297 A | 9/1994 | Colson, Jr. et al. | |
| 5,377,864 A | 1/1995 | Blechl et al. | |
| 5,405,048 A | 4/1995 | Rogers et al. | |
| 5,431,299 A | 7/1995 | Brewer et al. | |
| 5,460,294 A | 10/1995 | Williams | |
| 5,468,110 A | 11/1995 | McDonald et al. | |
| 5,480,062 A | 1/1996 | Rogers et al. | |
| 5,520,450 A | 5/1996 | Colson, Jr. et al. | |
| 5,564,803 A | 10/1996 | McDonald et al. | |
| 5,593,267 A | 1/1997 | McDonald et al. | |
| 5,661,978 A | 9/1997 | Holmes et al. | |
| D384,578 S | 10/1997 | Wangu et al. | |
| 5,713,485 A | 2/1998 | Liff et al. | |
| 5,716,114 A | 2/1998 | Holmes et al. | |
| 5,745,366 A | 4/1998 | Higham et al. | |
| 5,761,877 A | 6/1998 | Quandt | |
| 5,797,515 A | 8/1998 | Liff et al. | |

(Continued)

*Primary Examiner* — Benjamin C Lee
*Assistant Examiner* — Peter Mehravari
(74) *Attorney, Agent, or Firm* — Alston & Bird LLP

(57) ABSTRACT

A carrier apparatus is provided that includes a body and a fastener configured to affix the body to a product. The body includes a radio frequency (RF) transponder tag, or marker for directing inclusion of an RF transponder tag, at a designated location on the body. The apparatus of this aspect further includes a positioning feature configured to position the body, RF transponder tag and affixed product relative to an RF antenna separate from the RF transponder tag. This positioning feature may be configured to position the body, RF transponder tag and affixed product in a manner ensuring approximately at least a predetermined spatial relationship between the RF transponder tag and the antenna or one or more other RF transponder tags located proximate the RF transponder tag. A carriage apparatus and method of storing a product are also provided.

23 Claims, 19 Drawing Sheets

U.S. PATENT DOCUMENTS

| | | |
|---|---|---|
| 5,805,456 A | 9/1998 | Higham et al. |
| 5,842,976 A | 12/1998 | Williamson |
| 5,878,885 A | 3/1999 | Wangu et al. |
| 5,880,443 A | 3/1999 | McDonald et al. |
| 5,883,806 A | 3/1999 | Meador et al. |
| 5,893,697 A | 4/1999 | Zini et al. |
| 5,905,653 A | 5/1999 | Higham et al. |
| 5,912,818 A | 6/1999 | McGrady et al. |
| 5,927,540 A | 7/1999 | Godlewski |
| 5,940,306 A | 8/1999 | Gardner et al. |
| 5,971,593 A | 10/1999 | McGrady |
| 6,003,006 A | 12/1999 | Colella et al. |
| 6,011,999 A | 1/2000 | Holmes |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,109,774 A | 8/2000 | Holmes et al. |
| 6,112,502 A | 9/2000 | Frederick et al. |
| 6,116,461 A | 9/2000 | Broadfield et al. |
| 6,151,536 A | 11/2000 | Arnold et al. |
| 6,170,230 B1 | 1/2001 | Chudy et al. |
| 6,176,392 B1 | 1/2001 | William et al. |
| 6,189,727 B1 | 2/2001 | Shoenfeld |
| 6,223,934 B1 | 5/2001 | Shoenfeld |
| 6,256,967 B1 | 7/2001 | Hebron et al. |
| 6,283,322 B1 | 9/2001 | Liff et al. |
| 6,289,656 B1 | 9/2001 | Wangu et al. |
| 6,338,007 B1 | 1/2002 | Broadfield et al. |
| 6,339,732 B1 | 1/2002 | Phoon et al. |
| 6,361,263 B1 | 3/2002 | Dewey et al. |
| 6,370,841 B1 | 4/2002 | Chudy et al. |
| 6,449,927 B2 | 9/2002 | Hebron et al. |
| 6,471,089 B2 | 10/2002 | Liff et al. |
| 6,497,342 B2 | 12/2002 | Zhang et al. |
| 6,499,270 B2 | 12/2002 | Peroni et al. |
| 6,532,399 B2 | 3/2003 | Mase |
| 6,564,121 B1 | 5/2003 | Wallace et al. |
| 6,581,798 B2 | 6/2003 | Liff et al. |
| 6,609,047 B1 | 8/2003 | Lipps |
| 6,611,733 B1 | 8/2003 | De La Huerga |
| 6,625,952 B1 | 9/2003 | Chudy et al. |
| 6,640,159 B2 | 10/2003 | Holmes et al. |
| 6,650,964 B2 | 11/2003 | Spano, Jr. et al. |
| 6,671,579 B2 | 12/2003 | Spano, Jr. et al. |
| 6,681,149 B2 | 1/2004 | William et al. |
| 6,742,671 B2 | 6/2004 | Hebron et al. |
| 6,755,931 B2 | 6/2004 | Vollm et al. |
| 6,760,643 B2 | 7/2004 | Lipps |
| 6,776,304 B2 | 8/2004 | Liff et al. |
| 6,785,589 B2 | 8/2004 | Eggenberger et al. |
| 6,790,198 B1 | 9/2004 | White et al. |
| 6,814,254 B2 | 11/2004 | Liff et al. |
| 6,814,255 B2 | 11/2004 | Liff et al. |
| 6,847,861 B2 | 1/2005 | Lunak et al. |
| 6,874,684 B1 | 4/2005 | Denenberg et al. |
| 6,892,780 B2 | 5/2005 | Vollm et al. |
| 6,895,304 B2 | 5/2005 | Spano, Jr. et al. |
| 6,963,791 B1 * | 11/2005 | Frederick et al. ............ 700/244 |
| 6,975,922 B2 | 12/2005 | Duncan et al. |
| 6,985,797 B2 | 1/2006 | Spano, Jr. et al. |
| 6,989,796 B2 | 1/2006 | Rahim |
| 6,996,455 B2 | 2/2006 | Eggenberger et al. |
| 7,010,389 B2 | 3/2006 | Lunak et al. |
| 7,014,063 B2 | 3/2006 | Shows et al. |
| 7,016,766 B2 | 3/2006 | William et al. |
| 7,040,504 B2 | 5/2006 | Broadfield et al. |
| 7,052,097 B2 | 5/2006 | Meek, Jr. et al. |
| 7,072,737 B2 | 7/2006 | Lunak et al. |
| 7,072,855 B1 | 7/2006 | Godlewski et al. |
| 7,077,286 B2 | 7/2006 | Shows et al. |
| 7,085,621 B2 | 8/2006 | Spano, Jr. et al. |
| 7,092,796 B2 | 8/2006 | Vanderveen |
| 7,093,755 B2 | 8/2006 | Jordan et al. |
| 7,100,792 B2 | 9/2006 | Hunter et al. |
| 7,103,419 B2 | 9/2006 | Engleson et al. |
| 7,111,780 B2 | 9/2006 | Broussard et al. |
| 7,139,639 B2 | 11/2006 | Broussard et al. |
| 7,150,724 B2 | 12/2006 | Morris et al. |
| 7,171,277 B2 | 1/2007 | Engleson et al. |
| 7,218,231 B2 | 5/2007 | Higham |
| 7,228,198 B2 | 6/2007 | Vollm et al. |
| 7,249,688 B2 | 7/2007 | Hunter et al. |
| 7,348,884 B2 | 3/2008 | Higham |
| 7,417,729 B2 | 8/2008 | Greenwald |
| 7,419,133 B2 | 9/2008 | Clarke et al. |
| 7,426,425 B2 | 9/2008 | Meek, Jr. et al. |
| 7,554,449 B2 | 6/2009 | Higham |
| 7,571,024 B2 | 8/2009 | Duncan et al. |
| 7,588,167 B2 | 9/2009 | Hunter et al. |
| 7,596,427 B1 * | 9/2009 | Frederick et al. ............ 700/243 |
| 7,783,383 B2 * | 8/2010 | Eliuk et al. .................... 700/245 |
| 2003/0117281 A1 | 6/2003 | Sriharto et al. |
| 2004/0061994 A1 * | 4/2004 | Kerr et al. .................... 361/679 |
| 2005/0088305 A1 | 4/2005 | Greene et al. |
| 2006/0102718 A1 * | 5/2006 | Kajino et al. ................ 235/385 |
| 2006/0108252 A1 * | 5/2006 | Lax .............................. 206/470 |
| 2006/0214864 A1 | 9/2006 | Rahim |
| 2006/0244599 A1 | 11/2006 | Taylor et al. |
| 2006/0289650 A1 | 12/2006 | Taylor et al. |
| 2007/0027577 A1 | 2/2007 | Lunak et al. |
| 2010/0265068 A1 * | 10/2010 | Brackmann et al. ....... 340/572.1 |

* cited by examiner

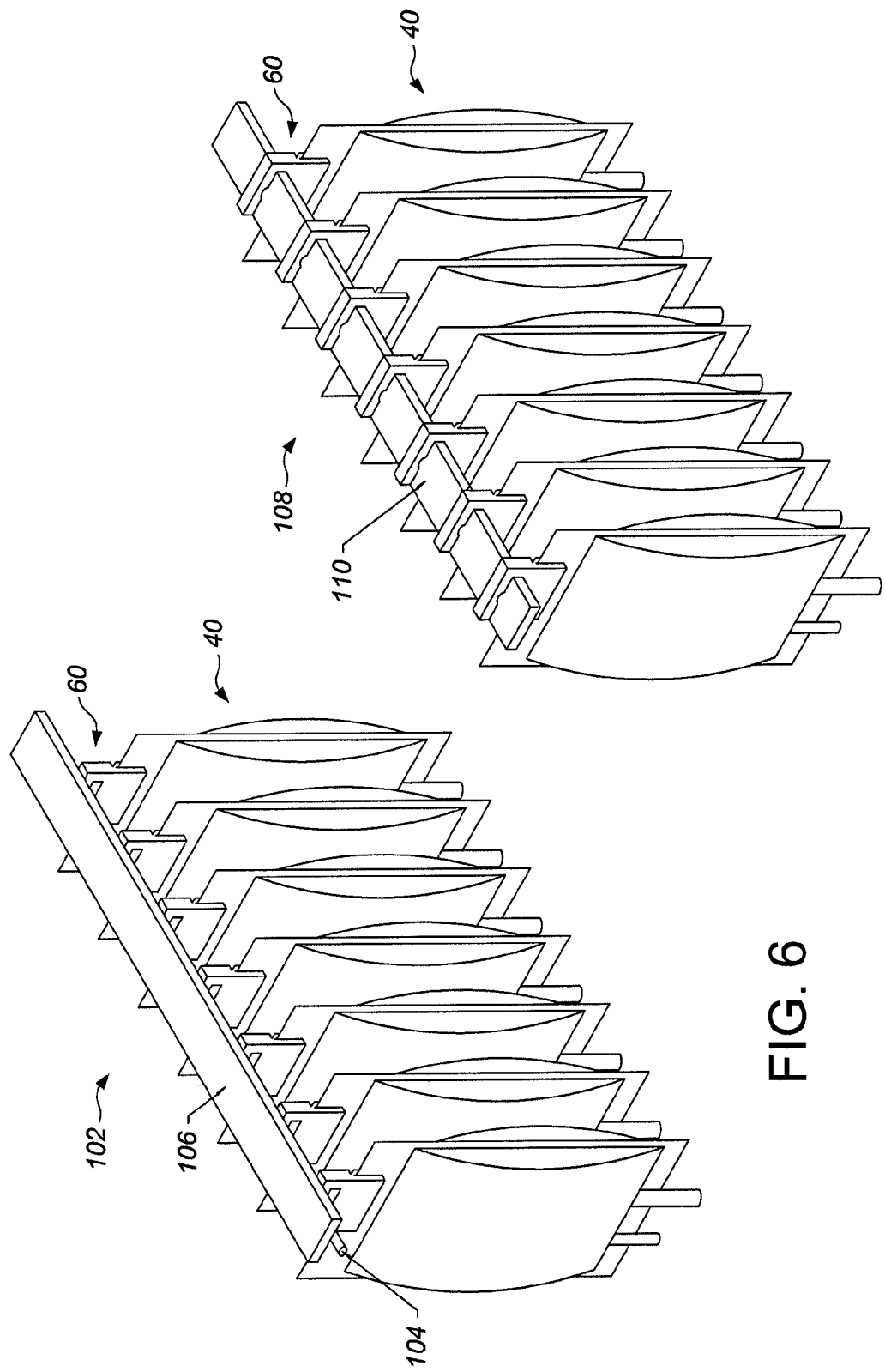

RADIO FREQUENCY ALIGNMENT OBJECT, CARRIAGE AND ASSOCIATED METHOD OF STORING A PRODUCT ASSOCIATED THEREWITH

CROSS-REFERENCE TO RELATED APPLICATIONS

The present application claims priority to U.S. Provisional Patent Application No. 61/017,298, entitled: Radio Frequency Alignment Object, Carriage and Associated Method of Storing a Product Associated Therewith, filed on Dec. 28, 2007, the content of which is incorporated herein by reference.

FIELD OF THE INVENTION

Exemplary embodiments of the present invention are generally directed to inventory tracking/monitoring and/or control systems and, more particularly, to inventory tracking/monitoring and/or control systems that utilize radio frequency identification (RFID) technology.

BACKGROUND OF THE INVENTION

Medical facilities, such as hospitals, nursing homes or the like, often have a centralized location such as a pharmacy department or materials management department within the facility to coordinate the dispensing of drugs or medical supplies to remote supply storage areas and patients within the medical facility. The departments utilizing medications and medical supplies in such facilities have long been burdened with the increasingly complex record keeping and inventory management that results from caring for hundreds, if not thousands, of patients every day. Various methods have been employed to assist a centralized pharmacy or other centralized medical supply departments with maintaining accurate records while attempting to reduce the burden of managing all of the information associated with the distribution of medications and medical supplies. The responsibilities of the centralized supply include: filling individual patient prescriptions on a daily basis; administration of drugs using the five rights: right drug, right patient, right dose, right time and right route; dispensing medical supplies to patients; maintaining sufficient inventory of each drug or medical supply so as to have sufficient quantities on hand; tracking of drug interactions to prevent a patient from being given a drug that has adverse affects when combined with other drugs; accounting for the purchase of medications and medical supplies for use in the facility; accounting associated with dispensing of medications and medical supplies to individual patients; tracking of medication expiration dates to rid inventories of expired medications; and tracking of drug lot numbers, for example, in the event of a recall of a particular drug or drug lot number.

Medical facilities typically dispense medications in one of three modes: centralized, decentralized, or a hybrid of partial decentralization. In facilities that are partly or fully decentralized, one function of the centralized pharmacy or materials management department is to restock various inventory locations (e.g., nurses' stations, unit-based supply cabinets, satellite pharmacies, or off-site facilities in a network, etc.) with the quantity and types of medications and medical supplies to be dispensed by the decentralized locations on a daily basis.

The need for storage locations in medical facilities remote from the centralized storage location stems from the need to be able to quickly and conveniently dispense medications and medical supplies (whether controlled or uncontrolled) to patients. To be able to dispense, there should be adequate supplies of the medications and medical supplies in the remote storage locations. To maintain the proper level of medications and medical supplies, accurate inventory control is highly desirable. The content of these storage locations varies depending upon the medical procedures practiced in the area where the storage location is situated. For example, a storage location near an emergency room may be stocked in a manner different from a storage location next to a surgical suite. Nevertheless, it is desirable to provide adequate supplies of all the required medications and medical supplies. It is also desirable to ensure that sufficient supplies are maintained at the decentralized and centralized storage locations without overstocking, because overstocking may increase the cost of inventory by requiring more items to be maintained in inventory than are actually needed. Overstocking of inventory may also result in waste through spoilage of unused supplies. Excessive restocking of locations may also be demanding on the facility's staff who devote more of their time to monitor the storage locations to ensure that sufficient supplies are available.

A variety of systems have been developed to track/monitor, and thus control, inventory. More recently, storage areas are being provided with dispensing carts or cabinets having computer processors for recording removal of medications or medical supplies from the dispensing cabinets. These carts or cabinets commonly include secured drawers having locked medication compartments, and include computers. The computer control systems commonly provide for limited access by selected medical personnel to such carts and cabinets and limited access to specific drawers or locations therein in response to entry of information into the computer. The computer control system creates inventory information for use by medical staff to ensure the continuity of the inventory in the carts or cabinets.

One emerging technology in the area of inventory tracking/monitoring and/or control systems is radio frequency identification (RFID) technology whereby RFID transponder tags may be affixed to units of a product (and, if so desired, the carts or cabinets themselves) to wirelessly track/monitor those units. Although the use of RFID technology may improve performance of such systems, current solutions do not ensure repeatable, strict placement of RFID tags with respect to one another and one or more RF reader antennas with which those tags are configured to communicate. And as such, current solutions are more likely to suffer from failures of the system to accurately monitor/track one or more tags due to damage to one or more tags, drawbacks associated with handling the units to which the tags are affixed (e.g., inability to effectively and efficiently separate tags and the units to which those tags are affixed) and/or the inability to provide a user friendly means to place RF tags within the RF antenna read field).

SUMMARY OF THE INVENTION

In light of the foregoing background, exemplary embodiments of the present invention provide an improved carrier apparatus, carriage apparatus and method utilizing RFID technology. The carriage apparatus may be configured to support or engage a carrier apparatus that is, in turn, affixed to a product. The carrier apparatus may include an RFID tag, and the carriage apparatus may include an antenna of an RFID reader, to thereby enable wireless monitoring/tracking of those products. In this regard, the positioning features may enable positioning of the product and affixed carrier apparatus (and RFID tag) in a manner that may ensure at least predetermined spatial relationships (e.g., distance, orientation, etc.) between the RFID tag and the antenna of an RFID reader, and/or one or more other RFID tags (affixed to respective one or more other products). These relationships, then, may enable a user to place the affixed product without (or with reduced) concern for misplacement of the RFID tag and the associated risk of failures of a system to accurately monitor/track the RFID tag.

According to one aspect of the present invention, an apparatus is provided that includes a body and a fastener configured to affix the body to a product, which may itself include a carrier defining an opening. For example, the fastener may comprise an adhesive tab that may be separable from the body. In an additional example, the fastener may have opposing tabs both of which have adhesive and are separable from the body which may be used to clamp around heavier products. As another example, the fastener may comprise a retainer having pair of tabs respectively including an indentation and projection. In such an instance, the tabs may be configured to extend on opposing sides of the carrier such that the projection is extendable through an existing opening in the product (e.g., of the product) and at least partially into the indention.

The body includes a radio frequency (RF) transponder tag, or marker for directing inclusion of an RF transponder tag, at a designated location on the body. The apparatus of this aspect further includes a positioning feature configured to support or position the body and RF transponder tag, and affixed product, relative to an RF antenna, such as an RF antenna of an RFID reader. This positioning feature may be configured to position the RF transponder tag in a manner ensuring approximately at least a predetermined spatial relationship between the RF transponder tag and the antenna or one or more other RF transponder tags located proximate the RF transponder tag.

The positioning feature may include first and/or second positioning features that facilitate reliable reading accuracy for the RF transponder tag. The first positioning feature may be configured to position the RF transponder tag in a manner ensuring approximately at least a first predetermined spatial relationship between the RF transponder tag and the reader antenna. The first positioning feature may, for example, comprise a hanging feature configured for suspending the body, RF transponder tag and affixed product from a hanging structure located proximate the antenna. In this regard, the hanging feature may be shaped, sized and/or positioned such that the RF transponder tag has approximately at least the predetermined spatial relationship with the antenna when the body, RF transponder tag and affixed product are suspended from the hanging structure. More particularly, for example, the first positioning feature may comprise an opening defined by the body, and the fastener may be configured to affix the body to a product such that the opening defined by the body is at least partially aligned with the opening defined by the carrier of the product.

In another example, the first positioning feature may comprise at least a portion of a dimension (e.g., width, length and/or height) of the body between an end of the body and the designated location. This portion of the dimension, then, may be configured such that the RF transponder tag has approximately at least the predetermined spatial relationship with the antenna when the body, RF transponder tag and affixed product are positioned proximate the antenna.

The second positioning feature may be configured to position the body, RF transponder tag and affixed product in a manner ensuring approximately at least a second predetermined spatial relationship between the RF transponder tag and one or more other RF transponder tags located proximate the RF transponder tag. In one exemplary embodiment, for example, the body may encase the RF transponder tag at the designated location. In such an instance, the second positioning feature may comprise at least a portion of a thickness of the body encasing the RF transponder tag. This thickness, then, may be configured for maintaining approximately at least a predetermined distance between the RF transponder tag and one or more other RF transponder tags located proximate the RF transponder tag.

As another example, the second positioning feature may comprise one or more projections configured for maintaining approximately at least a predetermined distance between the RF transponder tag and one or more other RF transponder tags located proximate the RF transponder tag. In one more particular embodiment, the body comprising first and second portions one or both of which includes a projection. The first and second portions may be foldable upon one another such that the projection at least partially encases the RF transponder tag and allows the user to affix an RF tag to the body in the designated marker area. In such an instance, the first and second portions of the body may respectively include one or more indentions and projections such that the projections is extendable at least partially into the indentions when the first and second portions are folded upon one another, with the indentions being configured to hold the projections in place.

According to other aspects of the present invention, a carriage apparatus and method are provided. Exemplary embodiments of the present invention therefore provide a carrier apparatus, carriage apparatus and method for storing products. As indicated above, and explained below, exemplary embodiments of the present invention may solve problems identified by prior techniques and provide additional advantages.

BRIEF DESCRIPTION OF THE DRAWINGS

Figure 14A:
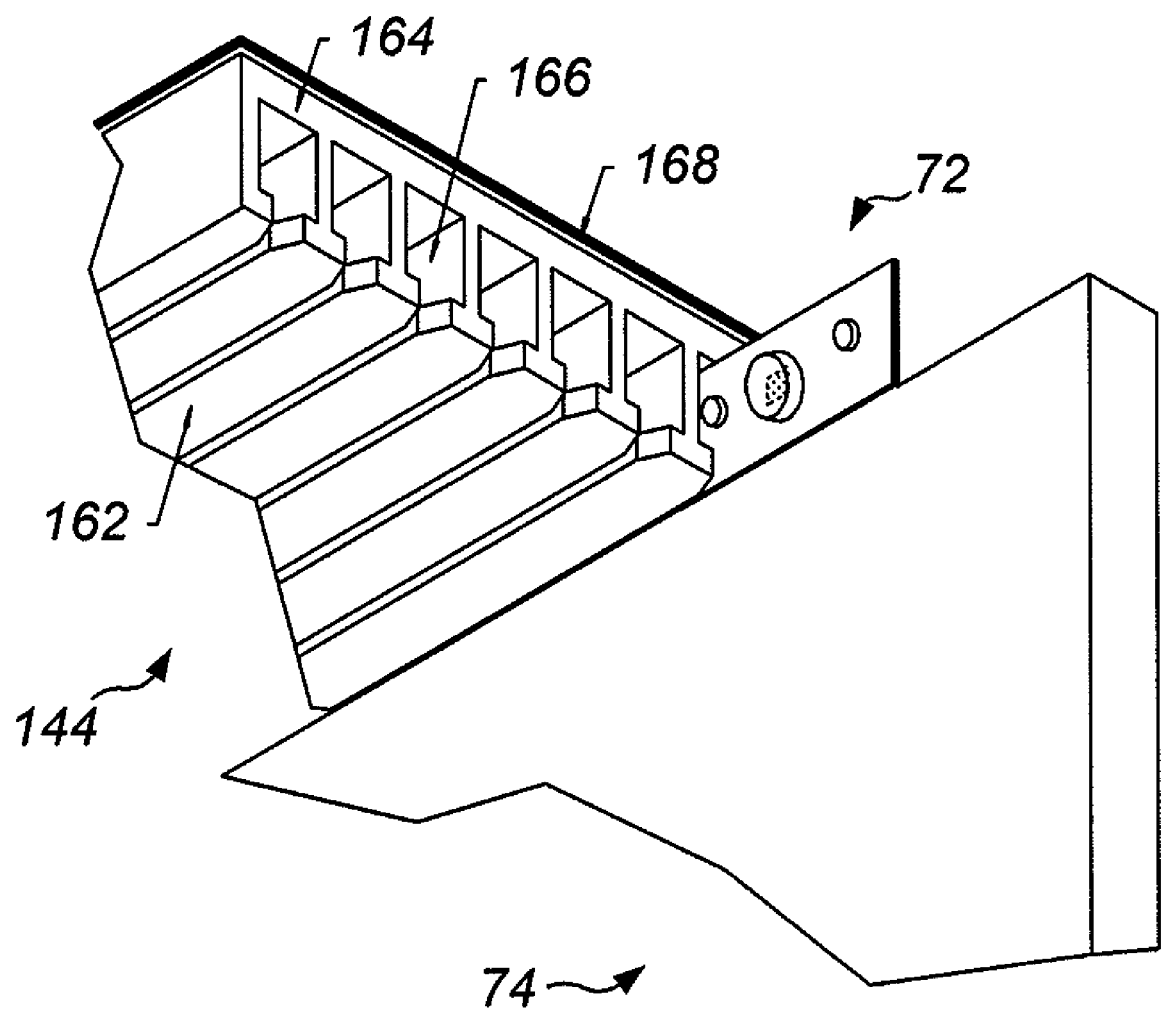
Figure 14B:
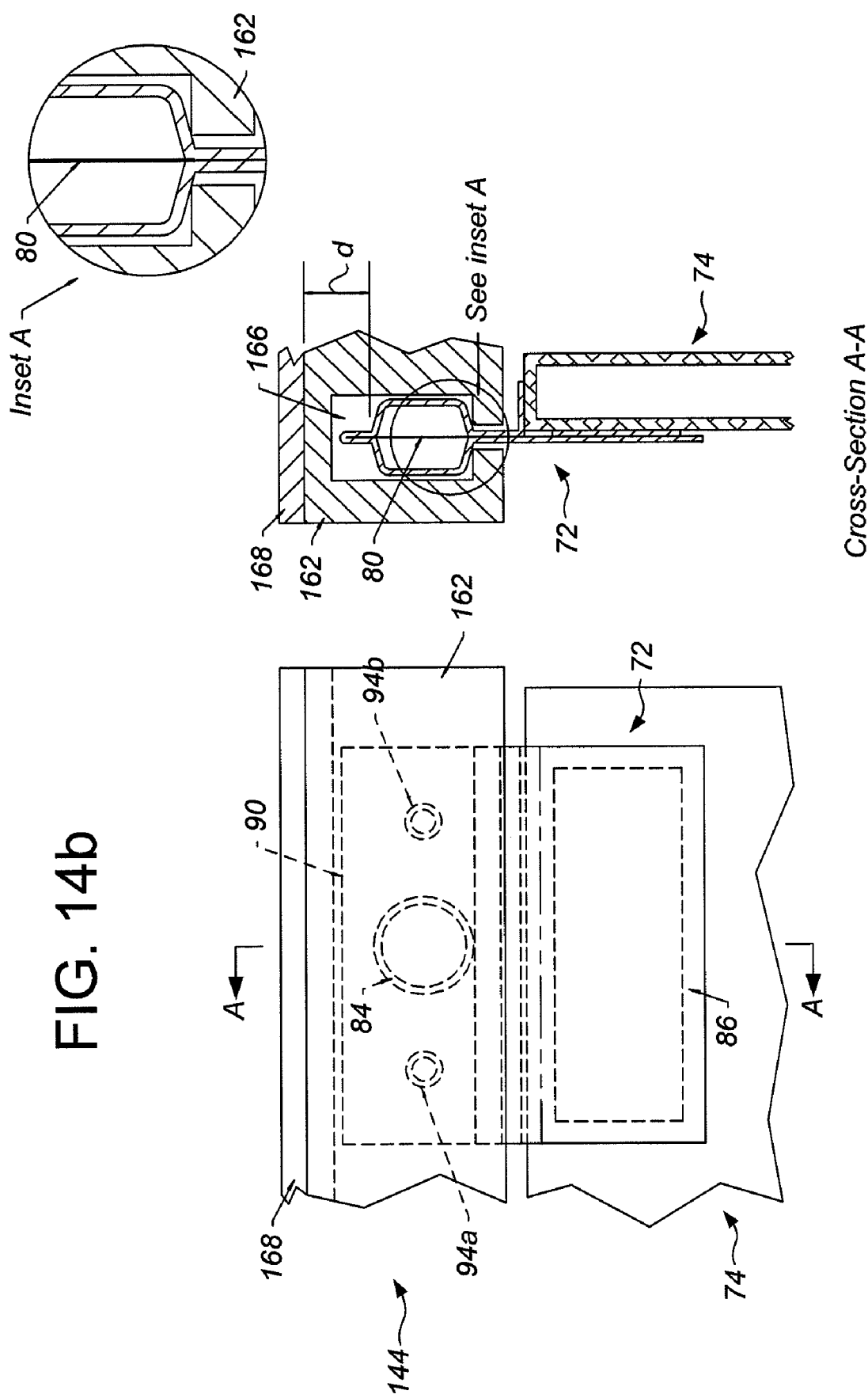
Figure 15:
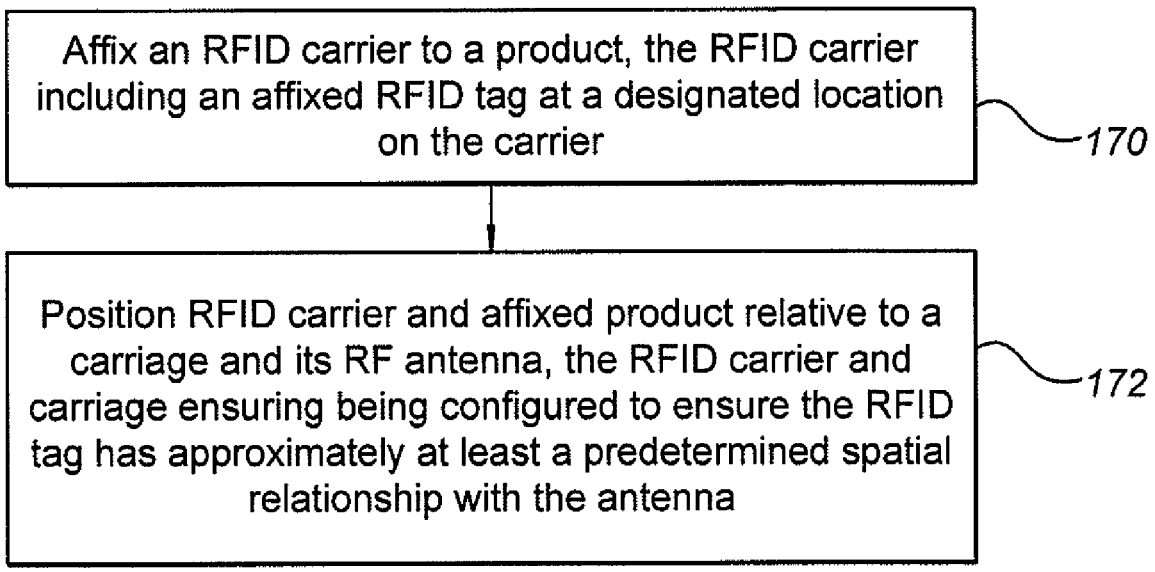

Having thus described the invention in general terms, reference will now be made to the accompanying drawings, which are not necessarily drawn to scale, and wherein:

FIGS. 1-4, illustrate various exemplary embodiments of one or more carrier apparatuses according to embodiments of the present invention;

FIGS. 5-14 illustrate various manners by which the RFID carriers may be positioned relative to themselves, as well as an RFID reader antenna, according to exemplary embodiments of the present invention; and FIG. 15 is a flowchart illustrating various steps in a method of storing one or more products, according to exemplary embodiments of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. For example, references may be made herein to directions and/or orientations; it should be understood, however, that any direction and/or orientation references are simply examples and that any particular direction or orientation may depend on the particular object, and/or the orientation of the particular object, with which the direction or orientation reference is made. Further, for example, references may be made herein to sizes, distances or other measures of magnitude that may be expressed quantitatively; it should be understood, however, that any size, distance or the like are simply examples and include approximations of the respective size, distance or the like. Like numbers refer to like elements throughout.

The carrier apparatus, carriage apparatus and method of exemplary embodiments of the present invention will be primarily described in conjunction with medical supply inventory tracking/monitoring systems. It should be understood, however, that the carrier apparatus, carriage apparatus and method of exemplary embodiments of the present invention can be utilized in conjunction with a variety of other applications, both in the medical supply industry and outside of the medical supply industry; and both in the context of inventory tracking/monitoring and/or control systems, and outside the context of inventory tracking/monitoring and/or control systems. In this regard, the carrier apparatus, carriage apparatus and method of exemplary embodiments of the present invention may generally be implemented in any of a number of different systems that utilize radio frequency identification (RFID) technology.

Generally, exemplary embodiments of the present invention provide a carrier apparatus for coupling, affixing or otherwise attaching an RFID tag to a unit of a product so as to ensure at least a predetermined spatial relationship of that RFID tag with respect to one or more antennas of one or more RFID readers (with which the RFID tag is configured to communicate), and/or with respect to one or more other RFID tags. The carrier apparatus could also be made from a material that may protect the RFID tag during handling. As explained herein, references may be made to positioning an RFID tag relative to an RFID reader antenna and/or other RFID tags; it should be understood, however, that the referenced positioning may more particularly relate to antennas of the respective RFID tag, RFID reader antenna and/or other RFID tags. A device referred to as an RFID tag may alternatively be referred to as a "tag," "RF tag," "RF transponder tag," "RF transponder," or the like. And a unit of a product at various instances herein may simply be referred to as the "product."

The carrier apparatus of exemplary embodiments of the present invention may be configured for affixation to a product such that the carrier apparatus extends in or projects out from the volume envelope of the unit. The carrier apparatus includes an RFID tag, or marker for directing a user to affix an RFID tag, at a designated location on the carrier apparatus. The carrier apparatus further includes a reader (first) positioning feature and/or a tag (second) positioning feature that may enable a user to place the product to which the carrier apparatus is affixed without (or with reduced) concern for misplacement of the RFID tag and the associated risk of failures of a system to accurately monitor/track the RFID tag.

More particularly, the reader positioning feature enables positioning the product (e.g., at a storage location), and thus the affixed carrier apparatus and RFID tag, in a manner that may ensure at least a (first) predetermined spatial relationship (e.g., distance, orientation, etc.) between the RFID tag and one or more antennas of one or more RFID readers (with which the RFID tag is configured to communicate). Similarly, the tag positioning feature enables positioning the RFID tag in a manner that may ensure at least a (second) predetermined spatial relationship (e.g., distance, orientation, etc.) between the RFID tag and one or more other RFID tags (affixed to respective one or more other products) when the product to which the RFID tag is affixed is positioned relative to the other RFID tag(s). These predetermined relationships may, for example, correspond to a desirable read position of the RFID tag with respect to the RFID reader antenna, such as by optimizing (for the particular size of RFID tag) the distance between the RFID tag and RFID reader antenna, and/or the RFID tag and one or more other RFID tags. And in various contexts, the carrier apparatus of exemplary embodiments of the present invention may enable substantially consistent positioning of a relatively small RFID tag close to an antenna and/or one or more other RFID tags.

A plurality of carrier apparatuses (having affixed RFID tags) of exemplary embodiments of the present invention may be affixed to a respective plurality of products (or units of a product) to thereby enable wireless monitoring/tracking of those products. The carrier apparatus of exemplary embodiments of the present invention may be configured as a retrofit to a broad range of products not otherwise specifically designed to accommodate the respective carrier apparatuses. In this regard, the carrier apparatus may be affixed to a product that otherwise includes a positioning feature that otherwise enables positioning the product, such as at a storage location. Further, the carrier apparatus may be configured such that the carrier apparatus (or at least the RFID tag affixed to the carrier apparatus) may be separated from the product to which the carrier apparatus is affixed, thereby enabling the user to selectively affix or separate an RFID tag to or from a respective product.

Reference will now be made to FIGS. 1-4, which illustrate various exemplary embodiments of one or more carrier apparatuses according to embodiments of the present invention, the carrier apparatuses being in the form of RFID carriers affixed to medical supplies (products) such as a catheter bags (or packages), IV (intravenous) bags, catheter boxes or the like. Again, however, it should be noted that the carrier apparatuses may be in a number of other forms. And the carrier apparatuses may be affixed to a number of other products, both in the medical supply industry and outside of the medical supply industry.

As shown in FIGS. 1a, 1b, 1c, 1d, 1e and 1f (at times collectively referred to as "FIG. 1"), the carrier apparatus of one exemplary embodiment may be in the form of an RFID carrier 10 configured for affixation to a catheter package 12, a box of catheter packages, an IV bag or any of a number of other types of packages. The catheter package may include a container 14 (only a portion of which is shown) for holding a catheter, volume of fluid or other material, and a package carrier 16 defining a passage or other opening 18 (positioning, e.g., hanging, feature) for hanging or otherwise suspending the container, and thus the catheter package, at a storage or other location. The RFID carrier may include a body 20, which may include an RFID tag 22 affixed, encapsulated or otherwise attached at a designated location (as shown, beneath or within a tag positioning feature such as a spacer or other projection 26). This location may enable proper positioning of the RFID tag with respect to an RFID reader antenna and/or other RFID tags. In this regard, the RFID carrier may be supplied to a user already including the RFID tag. Alternatively, the RFID-carrier body may include a marker or other identifier for directing the user to affix an RFID tag at the designated location on the RFID carrier; the marker facilitating the user properly positioning the RFID tag on the RFID carrier.

The RFID carrier 10 may also include an appropriate fastener coupled to (or integral with) the body 20 for affixing the RFID carrier to the catheter package 12. As shown, for example, this fastener may comprise an adhesive tab 28 (e.g., transparent adhesive tab). As shown more particularly in FIG.

Figure 1A:
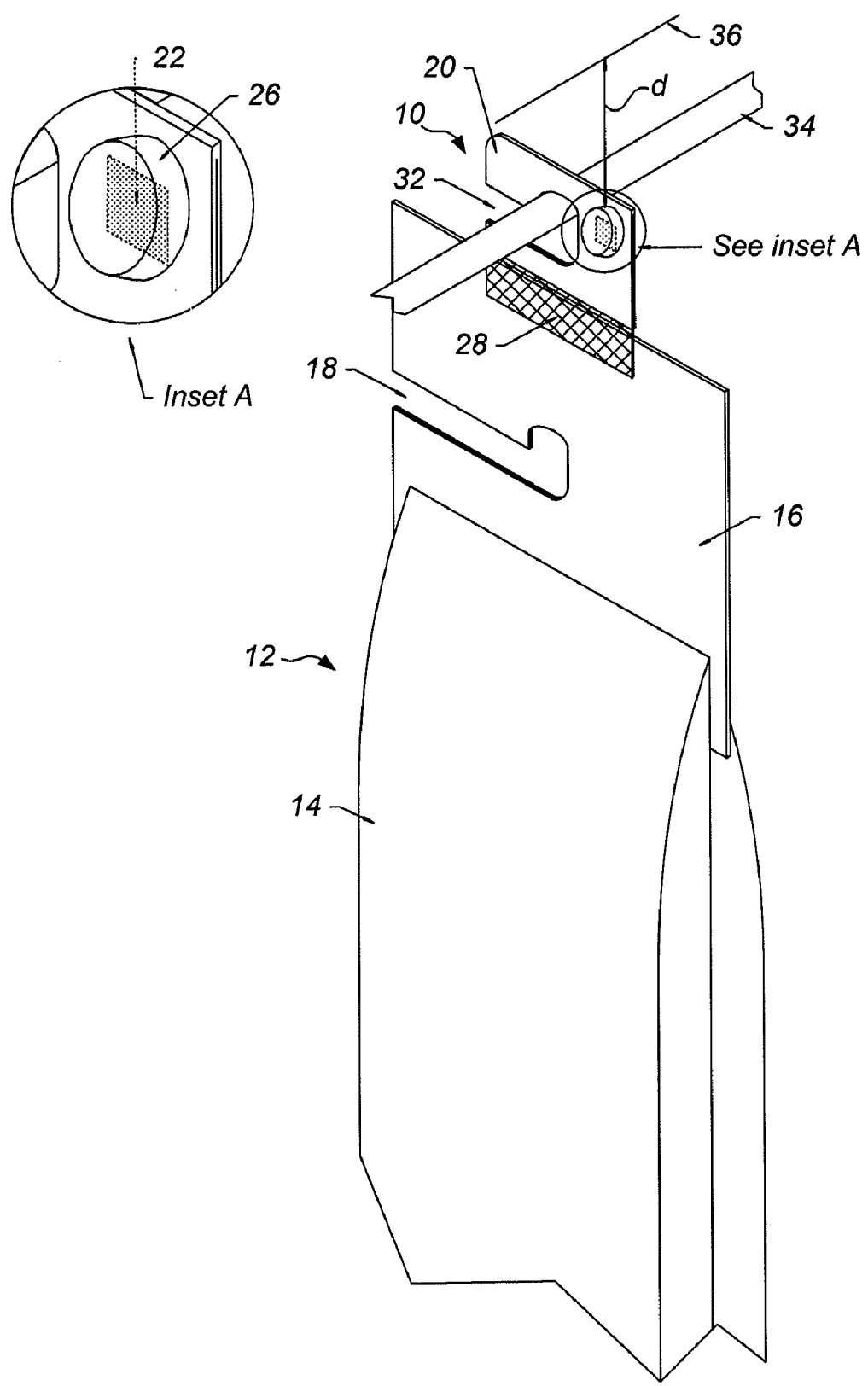
Figure 1B:
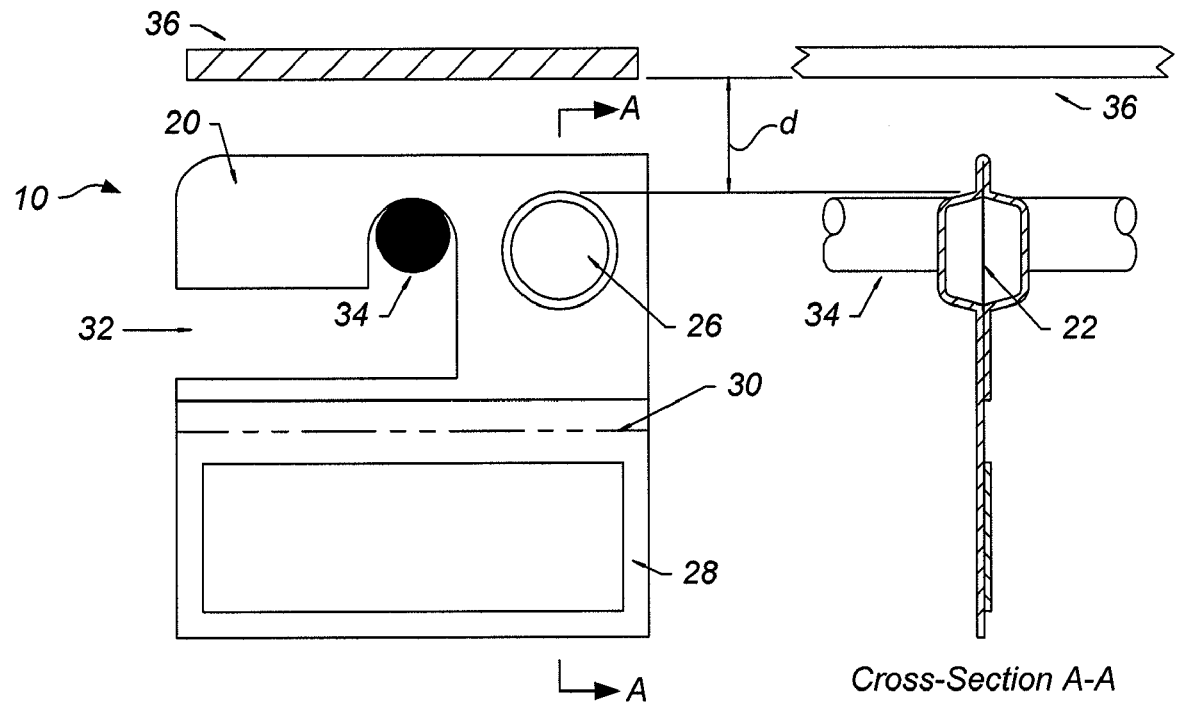
Figures 1C, 1D:
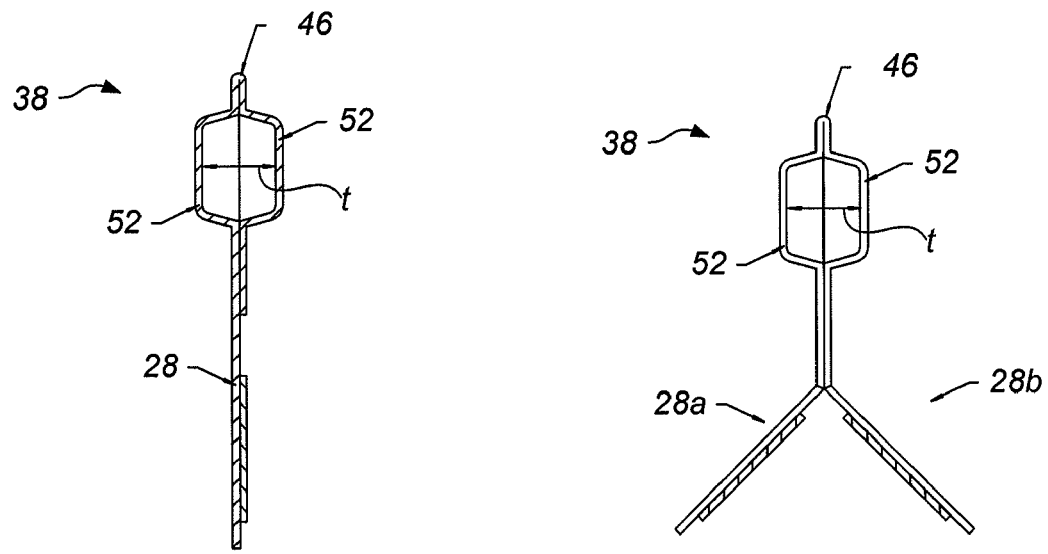

1c, for example, the fastener may comprise a single adhesive tab for affixing the RFID carrier to a surface of the catheter package (or package carrier 16); or as shown in FIG. 1d, may comprise a pair of adhesive tabs 28a, 28b for affixing the RFID carrier to opposing surfaces of the catheter package (or package carrier). In either instance, RFID carrier may include a perforation 30 or other feature to permit easy separation of the body, and hence the RFID tag, from the catheter package, such as by separating the adhesive tab (and affixed catheter package) from the remainder of the RFID carrier. If necessary or otherwise desirable, then, an RFID tag affixed to a catheter package may be separated from that package, such as if the catheter package is to be returned to its source (such an instance may further benefit from a transparent adhesive tab, which would be the only portion of the RFID carrier remaining affixed to the package).

By affixing the RFID carrier 10 to the catheter package 12 via an adhesive tab 28, the RFID carrier may extend or project out from the package. Thus, the material within the container 14 may be less likely to affect the ability of an RFID reader and antenna to read or otherwise communicate with the RFID tag 22. In addition, the RFID tag may be affixed to the package so as to avoid obscuring relevant information on the package carrier 16, and may be affixed to different packaging configurations of one or more manufacturers without modification to the RFID carrier.

As indicated above, the RFID carrier 10 may include positioning features that enable the user to place the affixed catheter package 12 without (or with reduced) concern for misplacement of the RFID tag 22 and the associated risk of failures of a system to accurately monitor/track the RFID tag. As shown, for example, the RFID carrier 10, or rather the carrier body 20, may further define a passage or other opening 32 (first positioning, e.g., hanging, feature) for hanging or otherwise suspending the RFID carrier and catheter package affixed to the RFID carrier container from a hook, rod (open or closed) or other similar hanging structure 34. The opening of the RFID carrier may be shaped, sized and/or positioned in a number of different manners, such as in a manner similar to that of the opening 18 defined by the package carrier 16 of the catheter package, and if so desired, may be at least partially aligned with the package carrier. The opening of the RFID carrier may be further shaped, sized and/or positioned such that, when the RFID carrier and affixed catheter package are suspended from a hanging structure, the RFID tag has at least a (first) predetermined relationship (e.g., distance, orientation, etc.) with the antenna of an RFID reader that may be located proximate to (or integrated with) the respective hanging structure (shown, for example, as distance—d—from a surface 36 of the RFID reader antenna). In the context of an approximately 12 mm×12 mm RFID tag, for example, the distance d may be on the order of approximately 10 mm or less. In this manner, the RFID carrier may ensure placement of the RFID tag in a desirable read position for the respective RFID reader antenna.

Figure 1E:
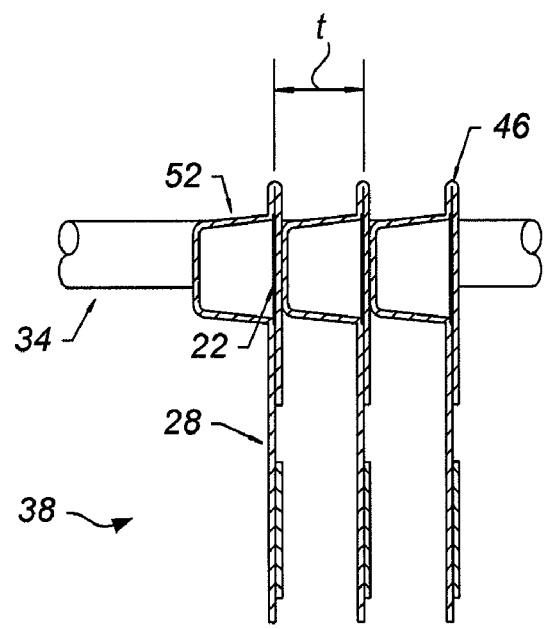
Figure 1F:
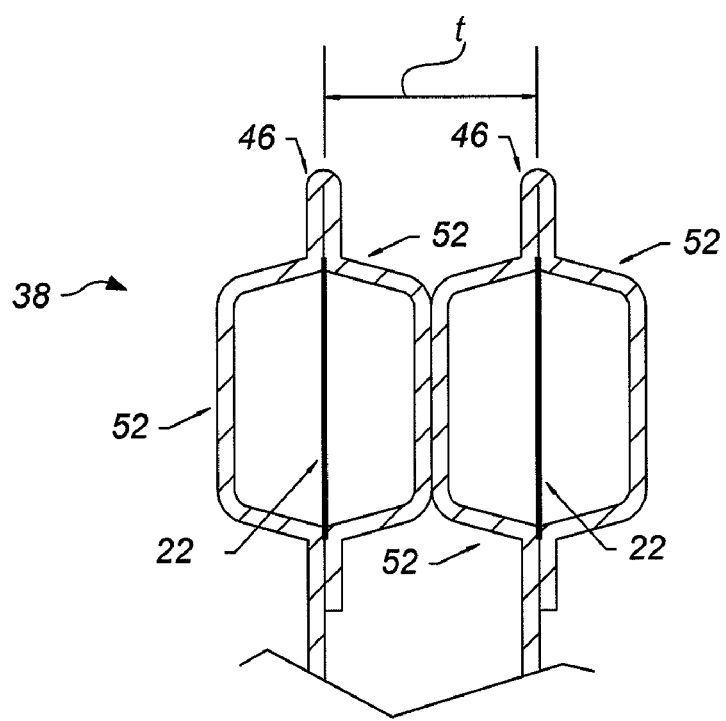

As indicated above, the RFID carrier 10 may also, for example, include a tag (second) positioning feature such as a spacer or other projection 26 for maintaining at least a (second) predetermined relationship (e.g., distance, orientation, etc.) between the RFID tag 22 and one or more other RFID tags. The projection may be shaped, sized and/or positioned in any of a number of different manners. For example, the projection may be positioned proximate the RFID tag, such as atop or beside the RFID tag; or alternatively, for example, the RFID tag may be positioned within the projection, which may be positioned at the designated location of the RFID carrier. The projection may be sized so as to have a particular thickness (t) and extend from one of opposing surfaces of the RFID carrier, as shown in FIG. 1e, or both of the opposing surfaces of the RFID carrier, as shown in FIGS. 1c, 1d and 1f; and may have a footprint sufficient to completely cover or otherwise surround the RFID tag. In the context of an approximately 12 mm×12 mm RFID tag, for example, the thickness of the projection may be on the order of approximately 10 mm or greater. The projection may serve to protect the RFID tag; but as shown for example in FIGS. 1e and 1f, the projection may additionally maintain at least the predetermined distance between the RFID tag and other tags, thereby reducing if not eliminating detrimental effects (e.g., tag coupling failure) that may be caused by tags placed too close to one another.

Figure 2A:
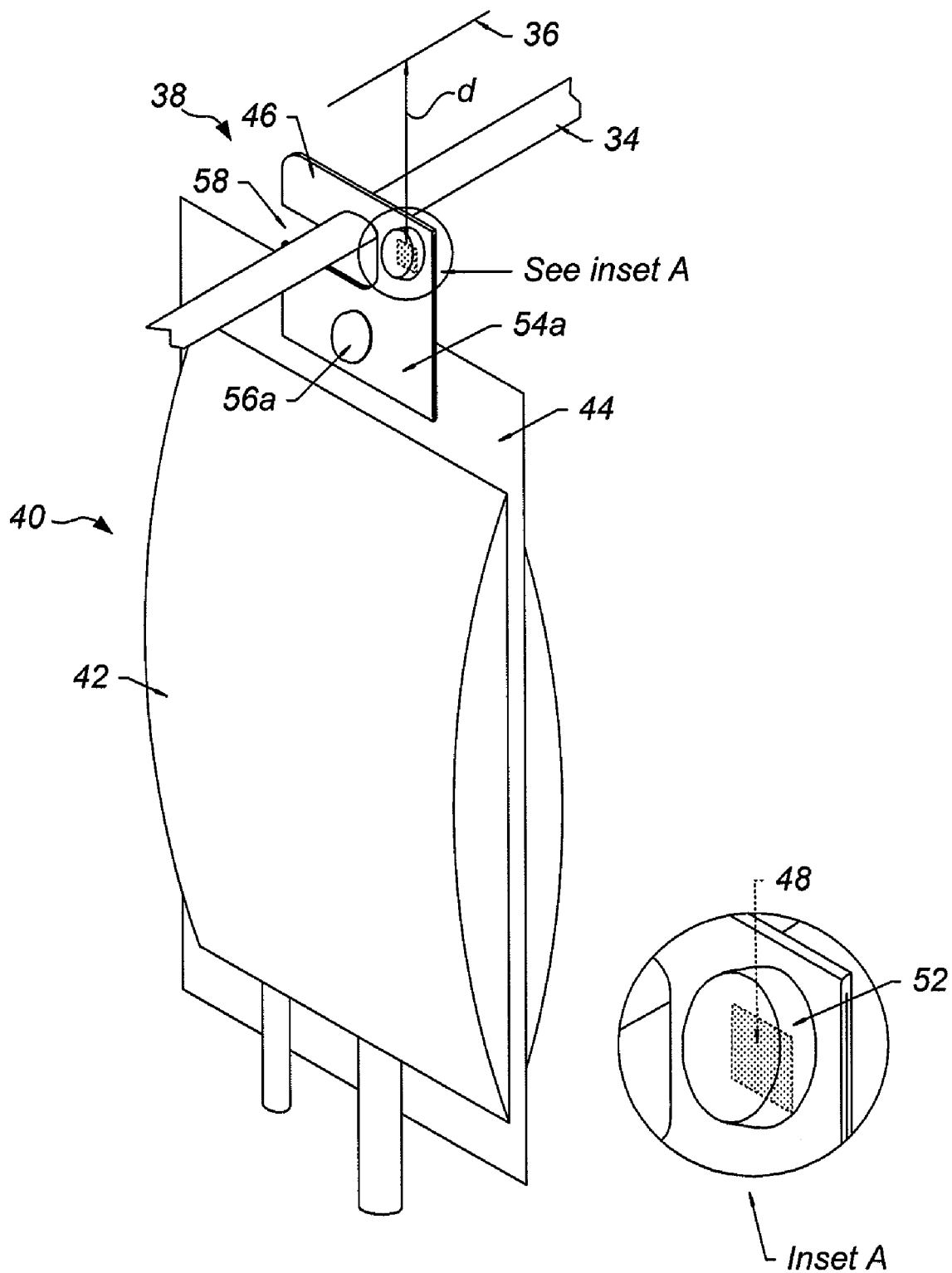
Figure 2B:
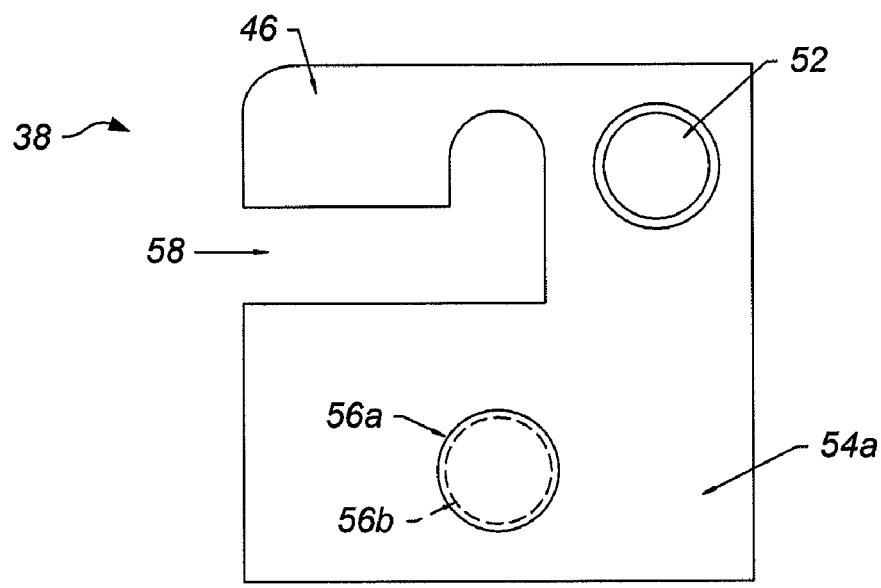
Figure 2C:
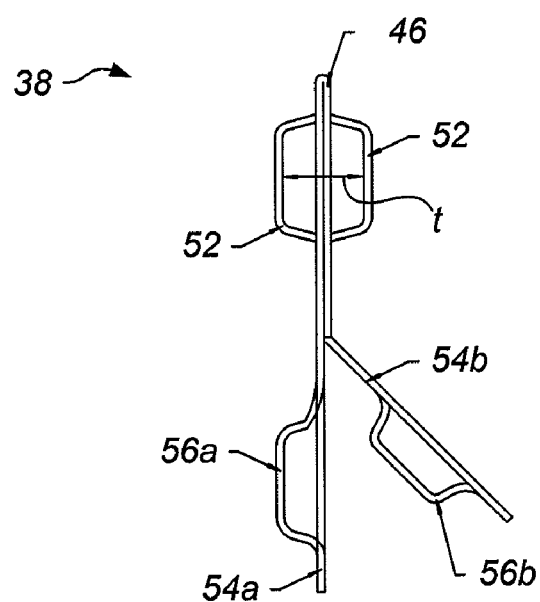

As shown in FIGS. 2a, 2b and 2c (at times collectively referred to as "FIG. 2"), the carrier apparatus of another exemplary embodiment may be in the form of an RFID carrier 38 also configured for affixation to a catheter package, a box of catheter packages, an IV bag 40 or any of a number of other types of packages. The IV bag may include a container 42 for holding a volume of fluid or other material, and a package carrier 44 defining a passage or other opening (beneath the RFID carrier as shown in FIG. 2) (positioning, e.g., hanging, feature) for hanging or otherwise suspending the container, and thus the IV bag, at a storage or other location. The RFID carrier may include a body 46, which may include an RFID tag 48 coupled, affixed or otherwise attached at a designated location (as shown, beneath or within a tag positioning feature such as a spacer or other projection 52). Similar to the embodiment of FIG. 1, this location may enable proper positioning of the RFID tag with respect to an RFID reader antenna and/or other RFID tags. Again, the RFID carrier may be supplied to a user already including the RFID tag; or alternatively, the RFID carrier may include a marker or other identifier for directing the user to affix an RFID tag at the designated location on the RFID carrier (the marker facilitating the user properly positioning the RFID tag on the RFID carrier).

To affix the RFID carrier 38 to the IV bag 40, and in a removable manner so as to permit easy separation of the RFID tag from the IV bag, the RFID carrier may include an appropriate fastener coupled to (or integral with) the body 46. As shown, for example, the RFID carrier may include a male/female snap retainer having a pair of tabs 54a and 54b, one of which includes an indention 56a, aperture or the like (female portion) and the other of which includes a snap projection 56b (male portion). In this regard, the RFID carrier may be affixed to the IV bag by extending the tabs on opposing sides of the package carrier such that the snap projection and indention at least partially align with the opening of the package carrier. The snap projection may then be extended through the package-carrier opening and at least partially into the indention, the indention being configured to hold the snap projection in place (but may be extended back through the indention and package-carrier opening to separate the RFID carrier from the IV bag with the application of an appropriate amount of force to the snap projection). If necessary or otherwise desirable, then, an RFID tag affixed to a IV bag may be separated from that package, such as if the IV bag is to be returned to its source.

Similar to the RFID carrier 10 of FIG. 1, the RFID carrier 38 of FIG. 2 may extend or project out from the container 42 of the IV bag 40. Thus, the material within the container may be less likely to affect the ability of an RFID reader to read or otherwise communicate with the RFID tag 48. In addition, the RFID tag may be affixed to the package so as to avoid obscuring relevant information on the package, and may be affixed to different packaging configurations of one or more manufacturers without modification to the RFID carrier.

As indicated above, the RFID carrier 38 may include positioning features that enable the user to place the affixed IV bag 40 without (or with reduced) concern for misplacement of the RFID tag 48 and the associated risk of failures of a system to accurately monitor/track the RFID tag. As shown, for example, the RFID carrier may further define a passage or other opening 58 (first positioning, e.g., hanging, feature) for hanging or otherwise suspending the RFID carrier and IV bag affixed to the RFID carrier container from a hook, rod (open or closed) or other similar hanging structure 34. The opening of the RFID carrier may be shaped, sized and/or positioned in a number of different manners, such as in a manner similar to that of the RFID carrier 10 of FIG. 1. The opening of the RFID carrier may be further shaped, sized and/or positioned such that, when the RFID carrier and affixed IV bag are suspended from a hanging structure, the RFID tag has at least a (first) predetermined relationship (e.g., distance, orientation, etc.) with the antenna of an RFID reader that may be located proximate to (or integrated with) the respective hanging structure (shown, for example, as distance—d—from a surface 36 of the RFID-reader antenna). In this manner, the RFID carrier may ensure placement of the RFID tag in a desirable read position for the respective RFID reader antenna.

The RFID carrier 38 may also, for example, include a tag (second) positioning feature such as a spacer or other projection 52 for maintaining at least a (second) predetermined relationship (e.g., distance, orientation, etc.) between the RFID tag 48 and one or more other RFID tags. The projection may be shaped, sized and/or positioned in any of a number of different manners, such as manners similar to those of the RFID carrier 10 of FIG. 1.

Figure 3:
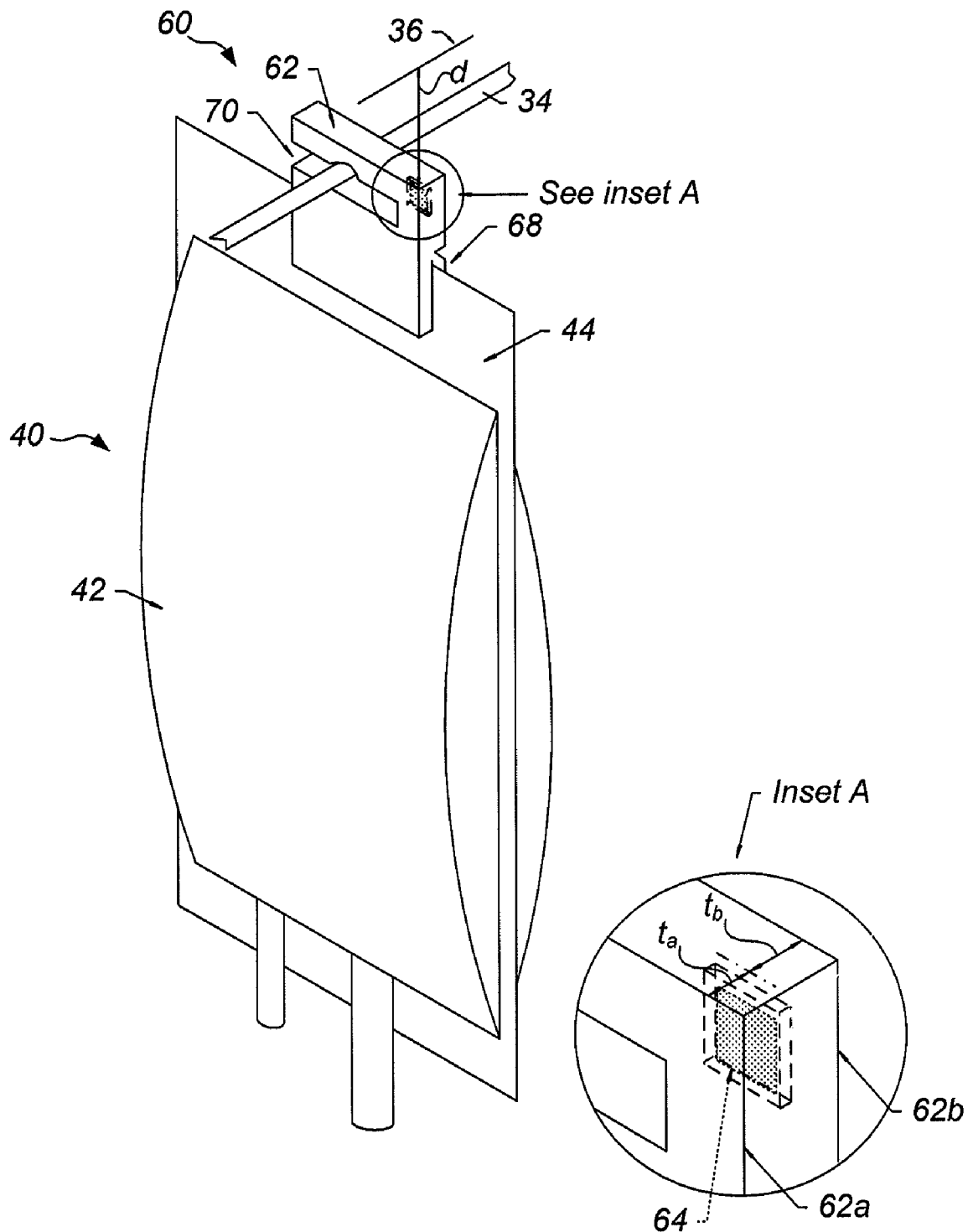
Figure 4A:
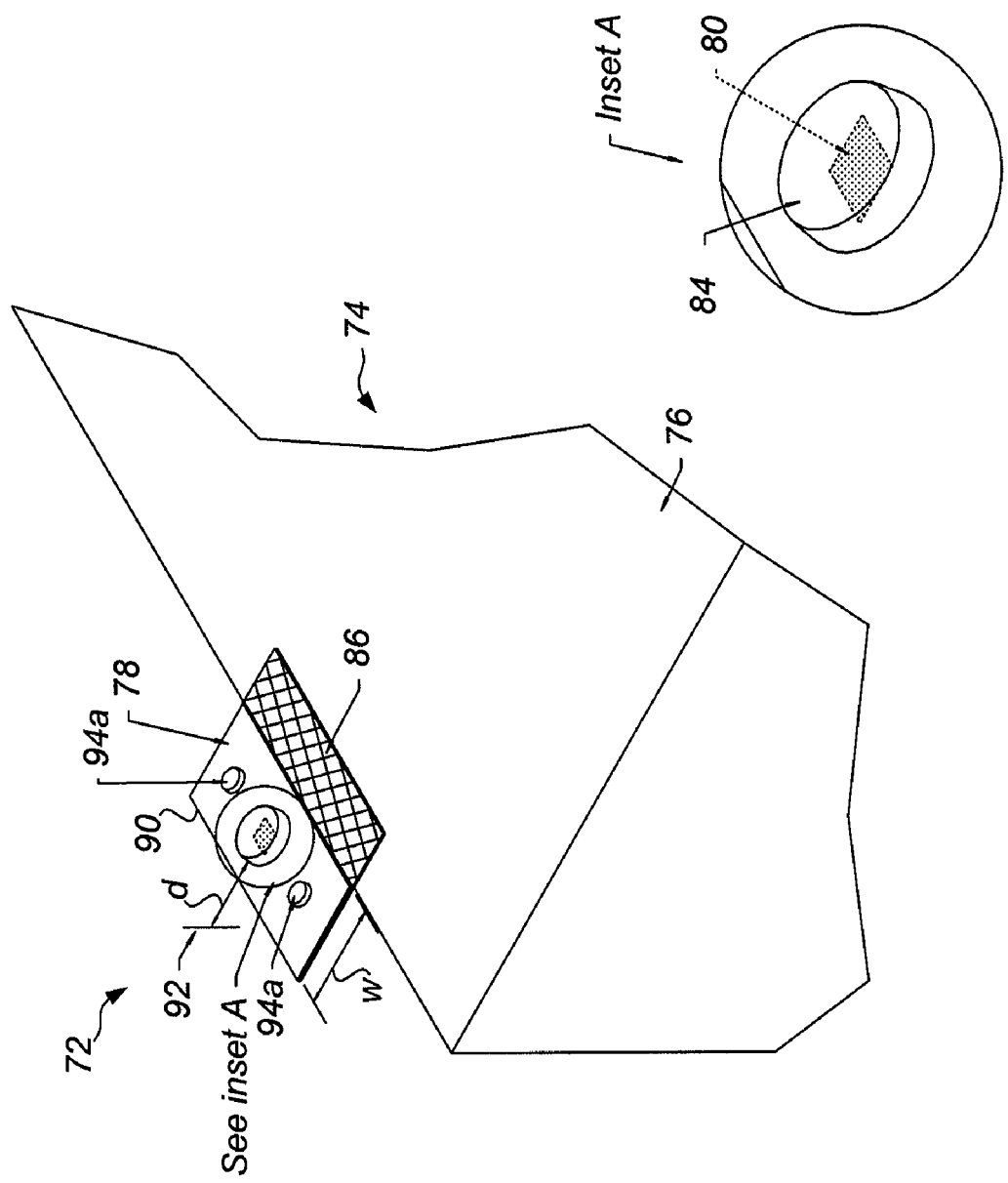
Figure 4B:
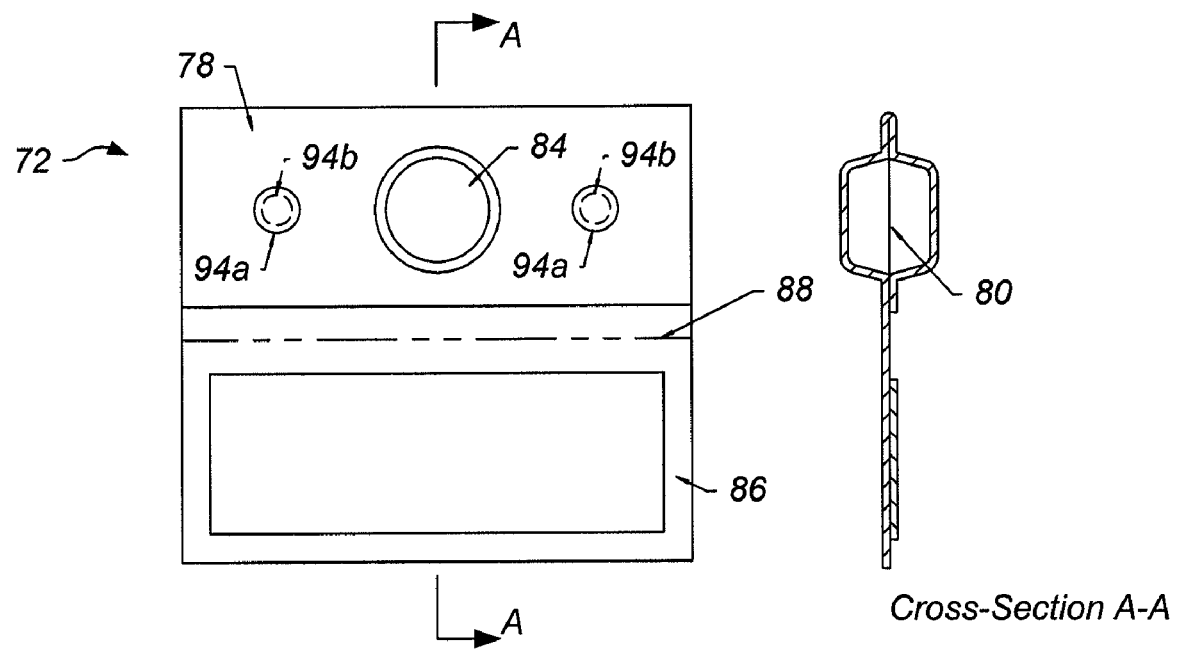
Figure 4C:
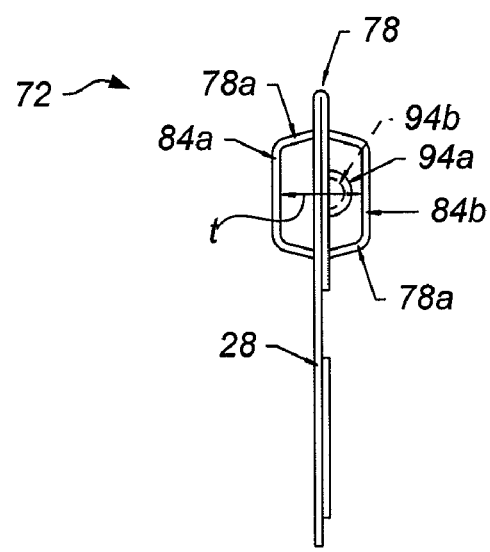

Reference is now made to FIG. 3, which illustrates the carrier apparatus of yet another exemplary embodiment may be in the form of an RFID carrier 60 configured for affixation to a catheter package, a box of catheter packages, an IV bag 40 or any of a number of other types of packages. Again, the IV bag may include a container 42 for holding a volume of fluid or other material, and a package carrier 44 defining a passage or other opening (beneath the RFID carrier as shown in FIG. 3) (positioning, e.g., hanging, feature) for hanging or otherwise suspending the container, and thus the IV bag, at a storage or other location. The RFID carrier may include a body 62, which in the embodiment of FIG. 3, may encase an RFID tag 64 at a designated location, which may enable proper positioning of the RFID tag with respect to an RFID reader and/or other RFID tags.

To affix the RFID carrier 60 to the IV bag 40, and in a removable manner so as to permit easy separation of the RFID tag 64 from the IV bag, the RFID carrier may include an appropriate fastener coupled to (or integral with) the body 62. As shown, for example, the RFID carrier may include a clip 68 integral with or otherwise coupled to the RFID carrier. In this regard, the RFID carrier may be affixed to the IV bag by clasping the clip to the package carrier 44 such as in a manner whereby the clip is at least partially aligned with the opening of the package carrier. If necessary or otherwise desirable, then, an RFID tag affixed to a IV bag may be separated from that package by unclasping the clip from the IV bag, such as if the IV bag is to be returned to its source.

Similar to the RFID carriers 10, 38 of FIGS. 1 and 2, the RFID carrier 60 of FIG. 3 may extend or project out from the container 42 of the IV bag 40. Again, the material within the container may therefore be less likely to affect the ability of an RFID reader to read or otherwise communicate with the RFID tag 64. Also, again, the RFID tag may be affixed to the package so as to avoid obscuring relevant information on the package, and may be affixed to different packaging configurations of one or more manufacturers without modification to the RFID carrier.

Also similar to the RFID carriers 10, 38 of FIGS. 1 and 2, the RFID carrier 60 may include positioning features that enable the user to place the affixed IV bag 40 without (or with reduced) concern for misplacement of the RFID tag 64 and the associated risk of failures of a system to accurately monitor/track the RFID tag. As shown, for example, the RFID carrier, or rather the carrier body 62, may further define a passage or other opening 70 (first positioning, e.g., hanging, feature) for hanging or otherwise suspending the RFID carrier and IV bag affixed to the RFID carrier container from a hook, rod (open or closed) or other similar hanging structure 34. The opening of the RFID carrier may be shaped, sized and/or positioned in a number of different manners, such as in a manner similar to that of the RFID carrier 10 of FIGS. 1 and 2. The opening of the RFID carrier may be further shaped, sized and/or positioned such that, when the RFID carrier and affixed IV bag are suspended from a hanging structure, the RFID tag has at least a (first) predetermined relationship (e.g., distance, orientation, etc.) with the antenna of an RFID reader that may be located proximate to (or integrated with) the respective hanging structure (shown, for example, as distance—d—from a surface 36 of the RFID reader antenna). In this manner, the RFID carrier may ensure placement of the RFID tag in a desirable read position for the respective RFID reader antenna.

Further, the RFID carrier 60 may also, for example, include a tag (second) positioning feature for maintaining at least a (second) predetermined relationship (e.g., distance, orientation, etc.) between the RFID tag 64 and one or more other RFID tags. In the embodiment of FIG. 3, this feature may include at least a portion of the thickness of the RFID carrier surrounding or otherwise encasing the RFID tag. In this regard, the thickness ($t_a$) of the RFID carrier between a front (or first) surface 62a of the RFID-carrier body and the RFID tag, and/or the thickness ($t_b$) between a rear (or second) surface 62b of the RFID-carrier body and the RFID tag, may be selected so as to maintain a predetermined distance between the encased RFID tag and other tags. The RFID carrier may therefore be sized to reduce if not eliminate detrimental effects (e.g., tag coupling failure) that may be caused by tags placed too close to one another.

As explained above, the RFID carrier 10, 38, 60 of exemplary embodiments of the present invention may define a passage or other opening 32, 58, 70 for hanging or otherwise suspending the RFID carrier and affixed product from a hook, rod (open or closed) or other similar hanging structure 34. It should be understood, however, that the RFID carrier of exemplary embodiments may include a number of other reader positioning features that enable positioning the RFID carrier and affixed product (e.g., at a storage location) in a manner that may ensure at least a (first) predetermined relationship (e.g., distance, orientation, etc.) between the position of the respective RFID tag and one or more antennas of one or more RFID readers (with which the RFID tag is configured to communicate). In this regard, reference is now made to FIGS. 4a, 4b and 4c (at times collectively referred to as "FIG. 4"), which illustrates an RFID carrier 72 according to yet another embodiment of the present invention.

As shown in FIG. 4, the RFID carrier 72 of this embodiment may be configured for affixation to a catheter package, a box 74 of catheter packages, an IV bag or any of a number of other types of packages. The box may include a container 76 (only a portion of which is shown) for holding one or more other products or other material. Similar to the RFID carrier 10 of FIG. 1, the RFID carrier 72 of FIG. 4 may include a body 78, which may include an RFID tag 80 coupled, affixed or otherwise attached at a designated location (as shown, beneath or within a tag positioning feature such as a spacer or other projection 84). Similar to before, this location may enable proper positioning of the RFID tag with respect to an RFID reader antenna and/or other RFID tags. Again, the RFID carrier may be supplied to a user already including the RFID tag; or alternatively, the RFID carrier may include a marker or other identifier for directing the user to affix an RFID tag at the designated location on the RFID carrier (the marker facilitating the user properly positioning the RFID tag on the RFID carrier).

As with the RFID carriers 10, 38, 60 of FIGS. 1, 2 and 3, the RFID carrier 72 of FIG. 4 may also include an appropriate fastener coupled to (or integral with) the body 78 for affixing the RFID carrier to the box 74. Similar to the RFID carrier of FIG. 1, for example, this fastener may comprise one or more adhesive tabs 86 (e.g., transparent adhesive tab). The RFID carrier, then, may include a perforation 88 or other feature to permit easy separation of the body, and hence the RFID tag, from the box, such as by separating the adhesive tab (and affixed box) from the remainder of the RFID carrier. If necessary or otherwise desirable, then, an RFID tag affixed to a box may be separated from that package, such as if the box is to be returned to its source.

By affixing the RFID carrier 72 to the box 74 via an adhesive tab 86, the RFID carrier may extend or project out from the box. Thus, the material within the container 76 may be less likely to affect the ability of an RFID reader to read or otherwise communicate with the RFID tag 80. In addition, the RFID tag may be affixed to the box so as to avoid obscuring relevant information on the box, and may be affixed to different box configurations of one or more manufacturers without modification to the RFID carrier.

As indicated above, the RFID carrier 72 may include positioning features that enable the user to place the affixed box 74 without (or with reduced) concern for misplacement of the RFID tag 80 and the associated risk of failures of a system to accurately monitor/track the RFID tag. In the embodiment of FIG. 4, one such feature (first positioning feature) may include at least a portion of a dimension of the RFID-carrier body 78 on which the RFID tag is affixed (illustrated and described herein as the width—w—of the body, although the length and/or height of the body may also function as a first positioning feature). In this regard, the RFID tag may be positioned from an end 90 of the body such that, when the RFID carrier and affixed box are positioned proximate to an RFID reader antenna (e.g., on a shelf or next to a side wall), the RFID tag has at least a (first) predetermined relationship (e.g., distance, orientation, etc.) with the antenna of an RFID reader (shown, for example, as distance—d—from a surface 92 of the RFID-reader antenna). In this manner, the RFID carrier may ensure placement of the RFID tag in a desirable read position for the respective RFID reader.

Similar to the RFID carriers 10, 38 of FIGS. 1 and 2, the RFID carrier 72 of FIG. 4 may also, for example, include a tag (second) positioning feature such as a spacer or other projection 84 for maintaining at least a (second) predetermined relationship (e.g., distance, orientation, etc.) between the RFID tag 80 and one or more other RFID tags. The projection may be shaped, sized and/or positioned in any of a number of different manners, such as manners similar to those of the RFID carriers 10, 38 of FIGS. 1 and 2.

As further shown, the body 78 of the RFID carrier of FIG. 4 (and/or the bodies of one or both of RFID carriers 10, 38 of FIGS. 1 and 2) may include first and second portions 78*a*, 78*b* that are foldable upon one another. One or both portions may include a projection 84*a* and 84*b* (as explained herein, the projections may form portions of a collective projection) such that, when the first and second portions of the body are folded upon one another, the respective projection(s) encase the RFID tag 80. When the RFID carrier is in an opened state, the projections 84*a* and 84*b* may function as a marker for affixation, placement or otherwise inclusion of an RF tag to the RFID carrier. To hold the first and second portions of the body in place, then, the RFID carrier may include one or more male/female snap retainers whereby the first portion of the body defines one or more indentions 94*a*, apertures or the like (female portions) and the second portion of the body includes a corresponding one or more snap projections 94*b* (male portions). In this regard, the first and second portions of the body may be folded upon one another such that the snap projection(s) extend at least partially into respective indention(s), the indention(s) being configured to hold the snap projection(s), and thus the first and second portions of the body, in place (but may be separable with the application of an appropriate amount of force to the snap projection(s)).

As explained above, the RFID carrier 10, 38, 60, 72 of exemplary embodiments of the present invention may be positioned include a reader positioning feature that enables positioning the carrier and affixed product (e.g., at a storage location) in a manner that may ensure at least a (first) predetermined relationship (e.g., distance, orientation, etc.) between the position of the RFID tag 22, 48, 64 and one or more antennas of one or more RFID readers (with which the RFID tag is configured to communicate). More particularly, for example, the RFID carriers 10, 38, 60 of FIGS. 1-3 may define a passage or other opening 32, 58, 70 for hanging or otherwise suspending the RFID carrier and affixed product from a hook, rod (open or closed) or other similar hanging structure 34; the opening being shaped, sized and/or positioned such that, when suspended, the RFID tag has at least a (first) predetermined relationship with an RFID-reader antenna (e.g., distance—d). Alternatively, for example, the RFID tag 80 of the RFID carrier 72 of FIG. 4 may be positioned from an end 90 of the carrier body 78 such that, when positioned (e.g., on a shelf), the RFID tag has at least a (first) predetermined relationship with an RFID-reader antenna.

Reference is now made to FIGS. 5-14, which illustrate various manners by which the RFID carriers may be positioned relative to themselves, as well as an RFID reader antenna, according to exemplary embodiments of the present invention. Generally, exemplary embodiments of the present invention may include a carriage including a support structure configured to support one or more RFID carriers and affixed products, and an antenna which may be configured for electrical coupling to an RFID reader (not shown). In addition to supporting the RFID carrier(s) and affixed product(s), however, the support structure may be further configured to further ensure at least the (first) predetermined spatial relationship (e.g., distance, orientation, etc.) between the respective RFID tag(s) and the RFID reader antenna.

Figure 5:
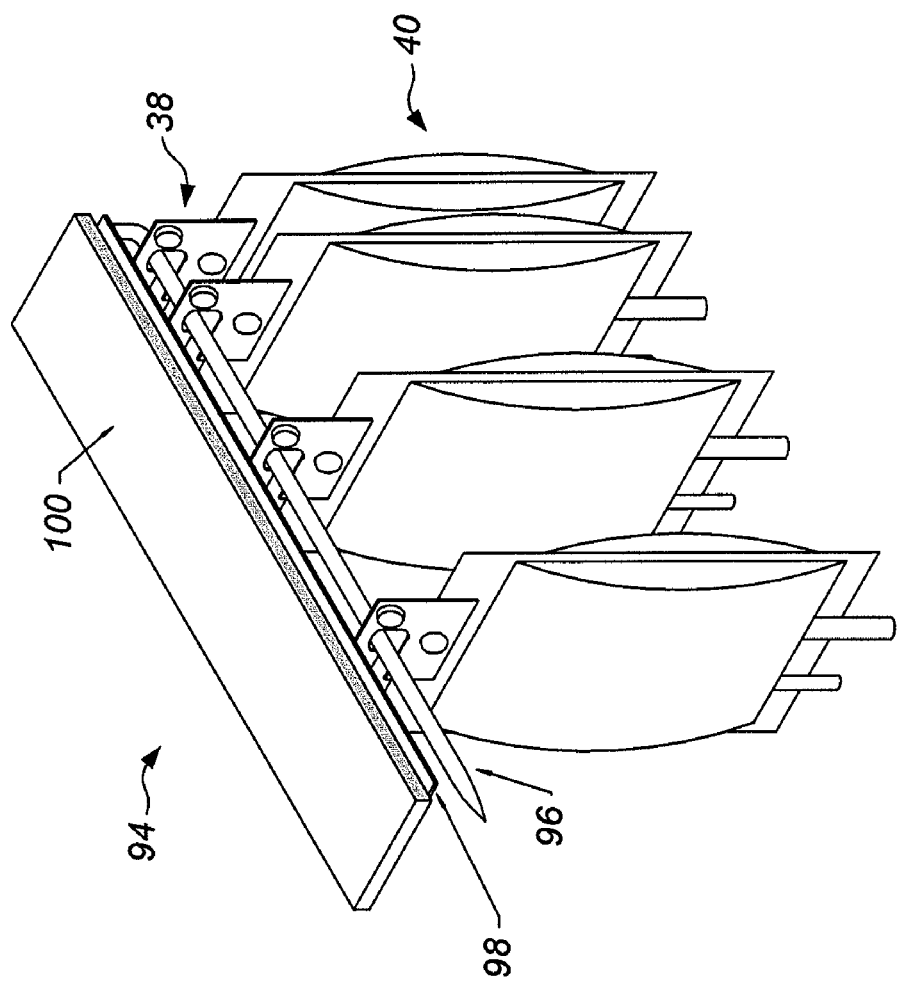

As shown in FIG. 5, for example, a carriage 94 may be configured to include an open rod 96 (support structure—hanging structure 34) for hanging or otherwise suspending one or more RFID carriers and respective affixed products (RFID carriers 38 being shown affixed to respective IV bags 40) via openings defined by the respective carriers (e.g., opening 58 of RFID carrier 38). The carriage may further include an RF reader antenna 98, which may be configured for electrical coupling to an RFID reader (not shown). The antenna and rod may be affixed to an appropriate mount 100, which may be mountable at a storage location, such as to a wall or in a cabinet, refrigerator (or other temperature-controlled location) or other similar structure or enclosure. The rod may directly or indirectly be affixed to the antenna and/or mount. In this regard, when the RFID carriers and affixed products are suspended from the rod, the respective RFID tags have may be ensured at least a predetermined distance from the antenna; the RFID carriers may therefore ensure placement of the RFID tag in a desirable read position for the respective RFID reader.

In lieu of having a separate antenna, rod and mount, the carriage of other exemplary embodiments may integrate one or more of the antenna, rod and mount into a structure configured to function as the respective components. As shown in FIG. 6, for example, a carriage 102 may include an RF reader antenna that may be integral with a rod 104 (support structure—hanging structure 34) or mount 106 to which the rod is affixed. Alternatively, as shown in FIG. 7, for example, a carriage 108 may include the antenna, rod (hanging structure 34) and mount integrated into a structure 110 configured to function as the antenna, rod and mount.

Figure 8:
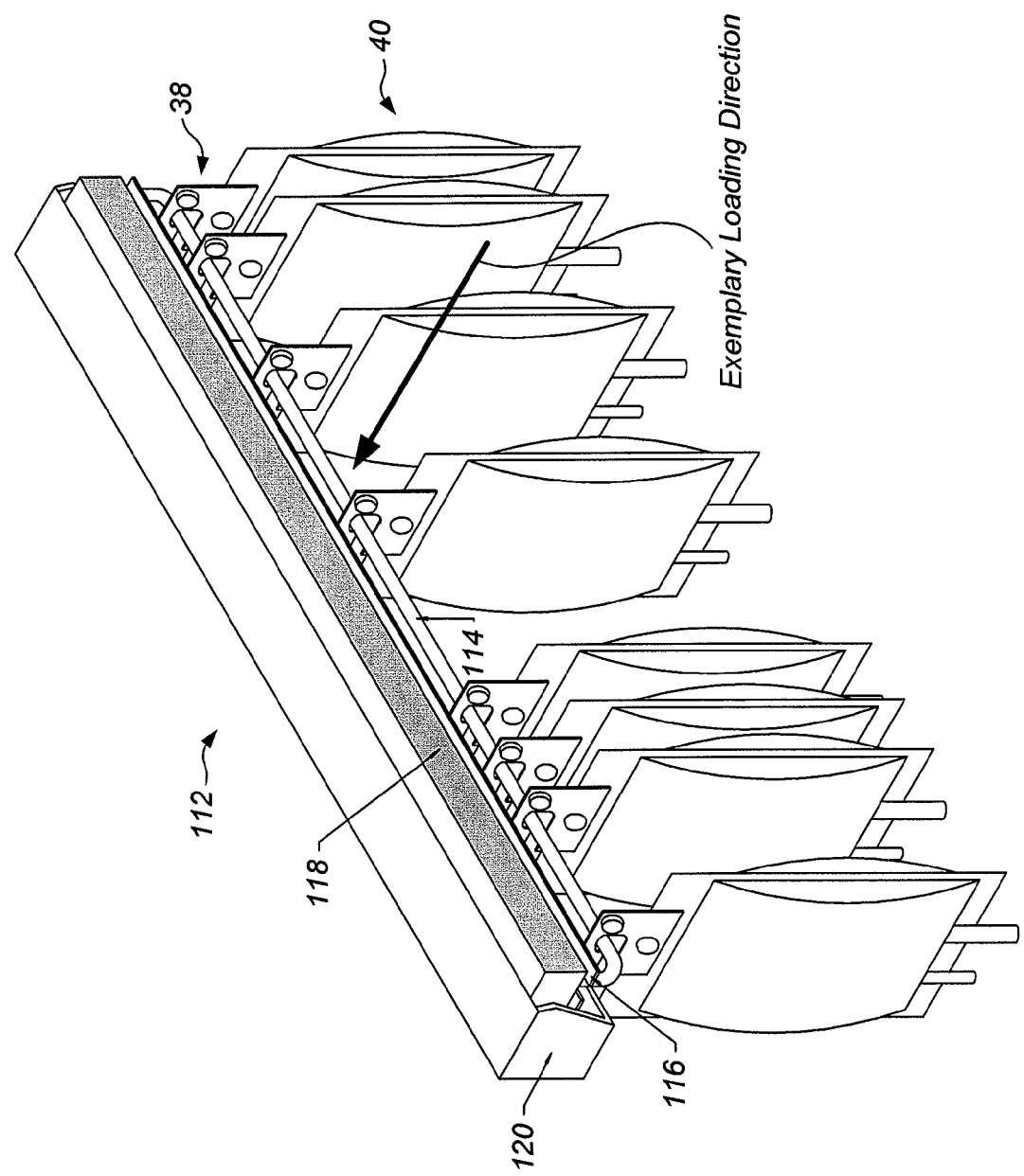

Referring now to FIG. 8, the carriage 112 of another exemplary embodiment may include a closed rod 114 (support structure—hanging structure 34) for hanging or otherwise suspending one or more RFID carriers and respective affixed products (RFID carriers 38 being shown affixed to respective IV bags 40) via openings define by the respective carriers (e.g., opening 58 of RFID carrier 38). Similarly, the carriage may include an RF reader antenna 116, which may be affixed to an appropriate mount 118 and configured for electrical coupling to an RFID reader (not shown). The rod may directly or indirectly be affixed to the antenna and/or mount. Thus, when the RFID carriers and affixed products are suspended from the rod, the respective RFID tags have may be ensured at least a predetermined distance from the antenna; the RFID carriers may therefore ensure placement of the RFID tag in a desirable read position for the respective RFID reader.

As also shown in FIG. 8, the antenna 116, mount 118 and/or at least a portion of the rod 114 may be at least partially housed within a cover 120. This cover may support the components of the carriage and facilitate increased performance of the carriage. In addition, the cover may be mountable at a storage location, such as to a wall or in a cabinet, refrigerator (or other temperature-controlled location) or other similar structure or enclosure.

Figure 9:
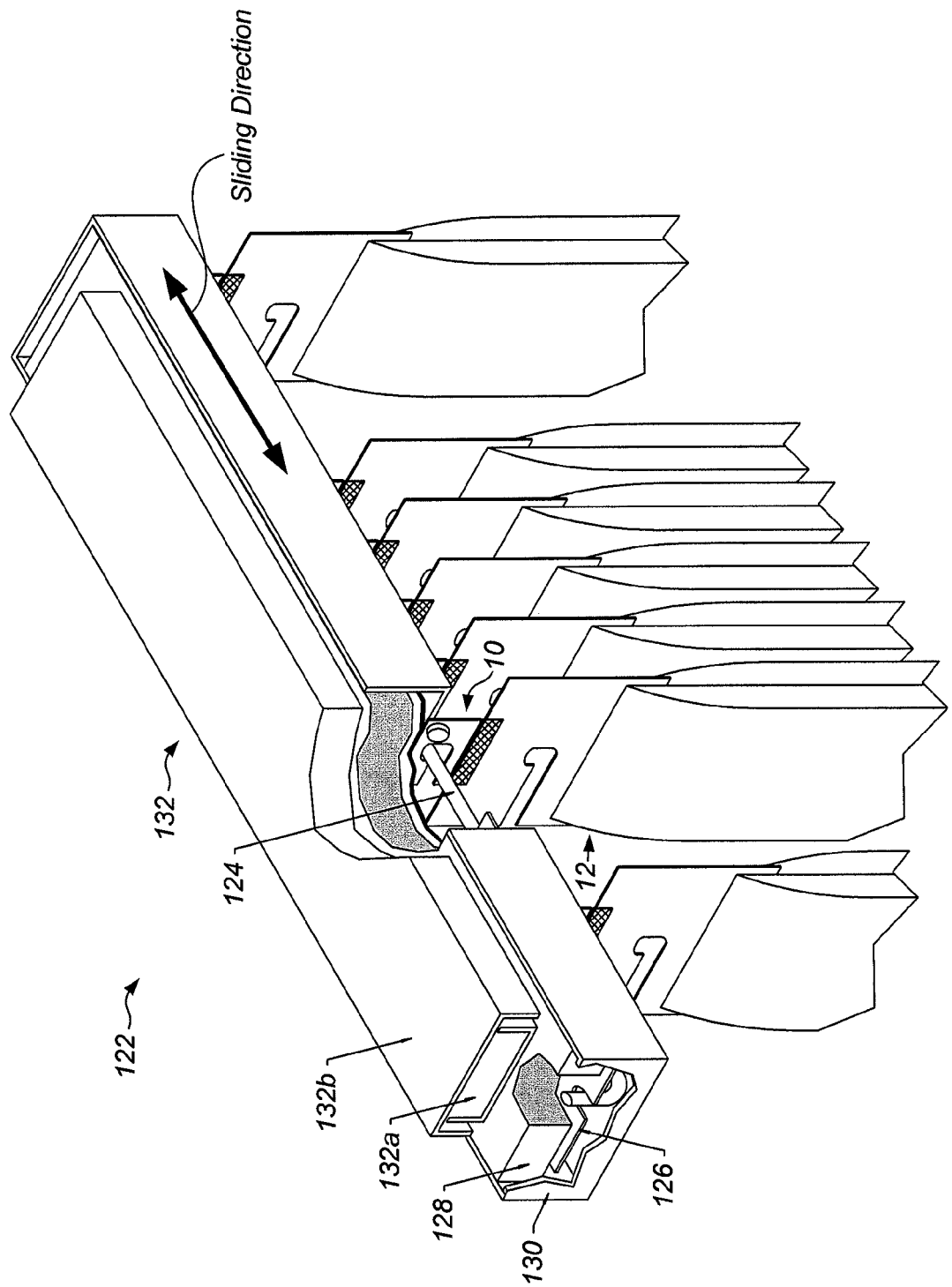
Figure 10:
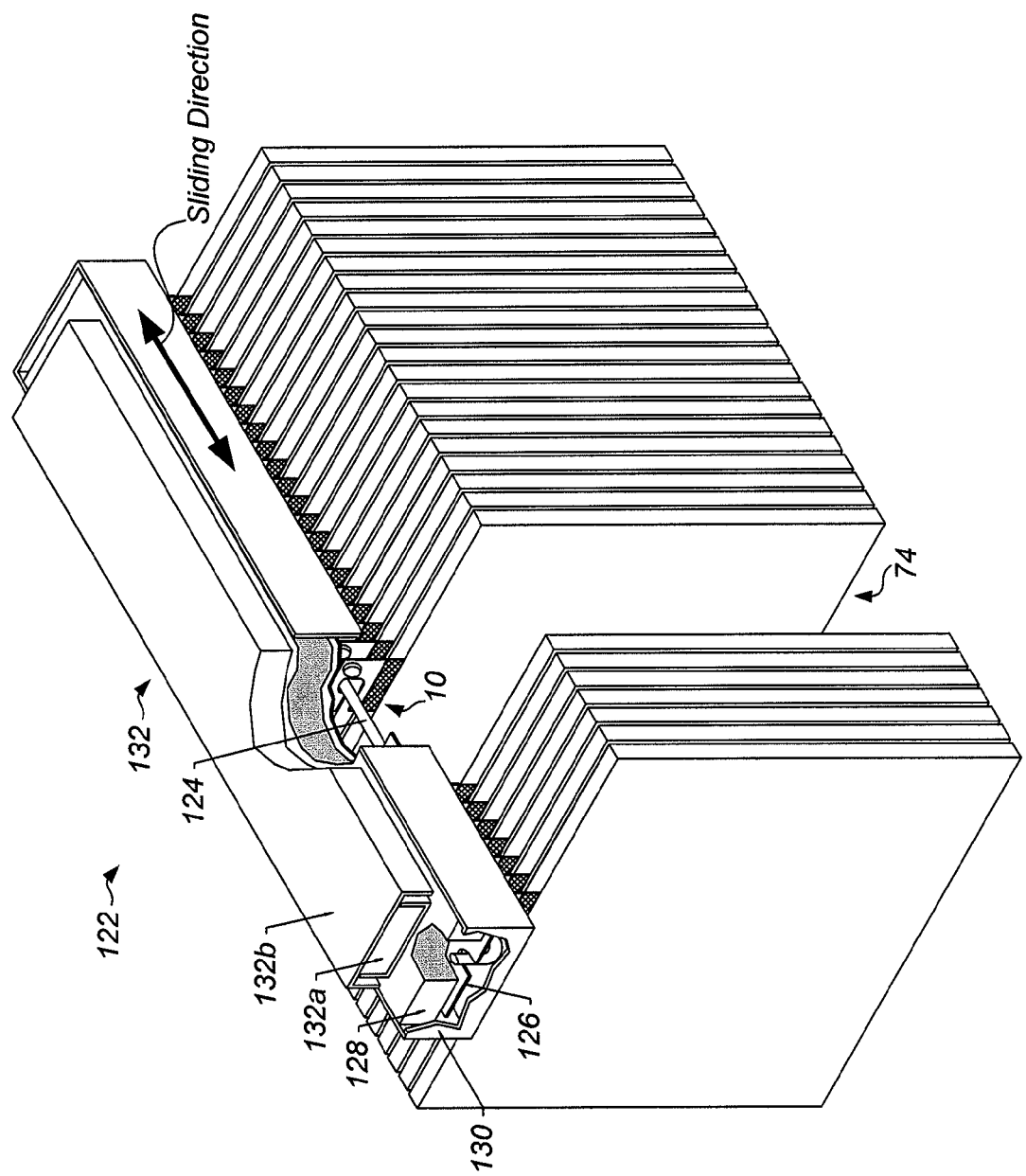

While the carriage 112 of FIG. 8 may be fixed mounted at a storage location, the carriage 122 of yet another exemplary embodiment may be slide mounted at a storage location. As shown in FIG. 9 (illustrating RFID carriers 10 affixed to catheter packages 12) and FIG. 10 (illustrating RFID carriers 10 affixed to catheter boxes 74), for example, this carriage may similarly include a closed rod 124 (support structure—hanging structure 34), antenna 126, mount 128 and cover 130. In addition, however, the carriage of FIGS. 9 and 10 may include a slide assembly 132. The slide assembly includes a first portion 132a affixed to the closed rod, antenna, mount and cover, and a second portion 132b slidably coupled to the first portion, such as by means of ball bearings or other similar mechanisms. The second portion, then, may be mounted or otherwise held in position at a storage location. The first portion, and affixed closed rod, antenna, mount and cover, then, may be slid out from the second portion so as to extend the respective components of the carriage, such as for easier loading, unloading (hanging) and/or viewing of products.

Figure 11:
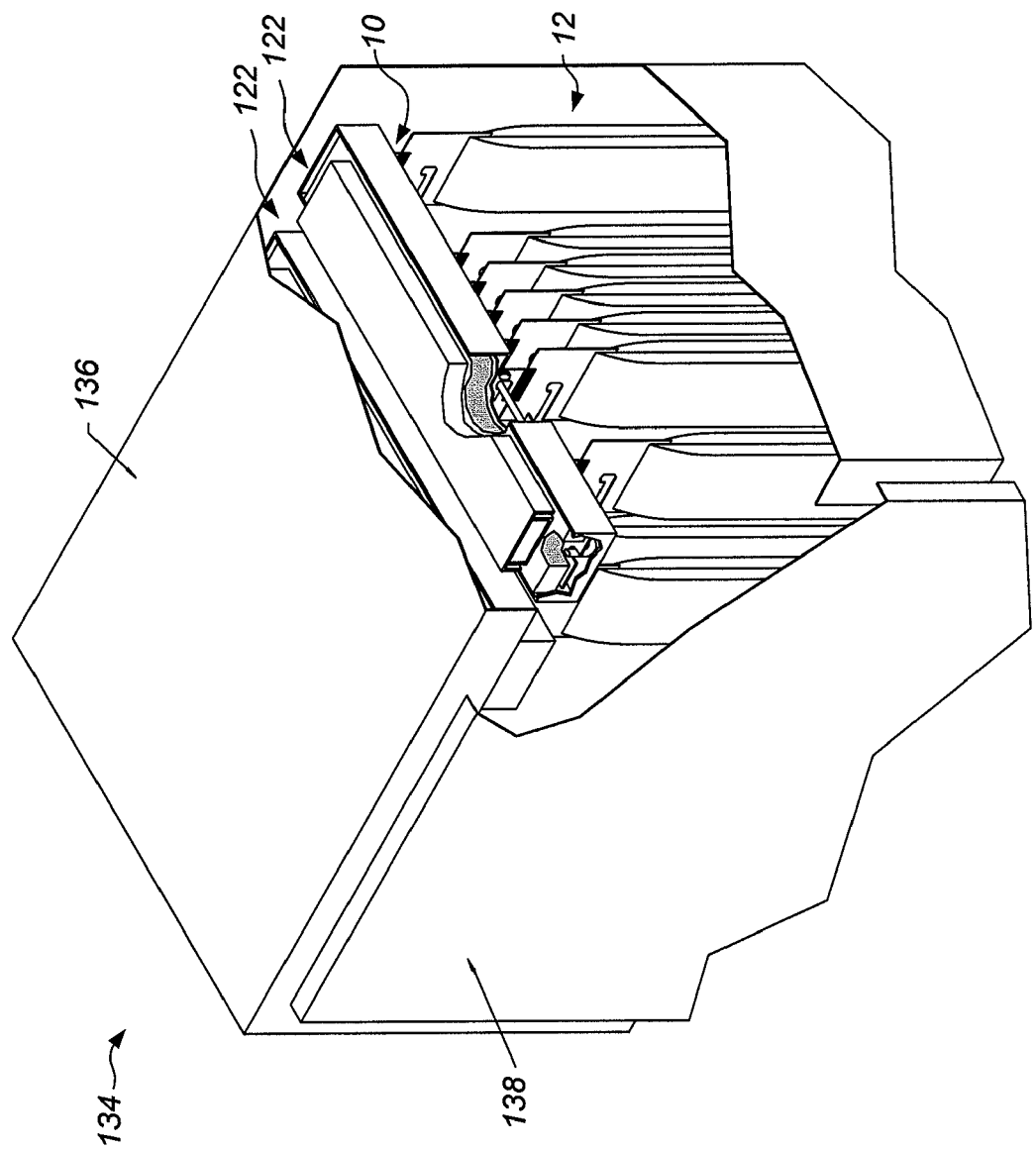

As indicated, the carriage 94, 102, 112, 122 of exemplary embodiments of the present invention may be mountable at a storage location, such as to a wall or in a cabinet, refrigerator (or other temperature-controlled location) or other similar structure or enclosure. A portion of an example of one such structure, a cabinet 134, is shown in FIG. 11. As shown, the cabinet includes an enclosure 136 and a door 138. Inside the cabinet, then, one or more carriages (as shown, for example, carriages 122) may be mounted within the enclosure, such as to an inside top surface of the enclosure. One or more products (e.g., catheter packages 12), then, may be loaded and unloaded (suspended from the hanging structures—e.g., rods 124) from the carriages via respective RFID carriers (e.g., carriers 10), and may be stored within the cabinet.

Figure 13:
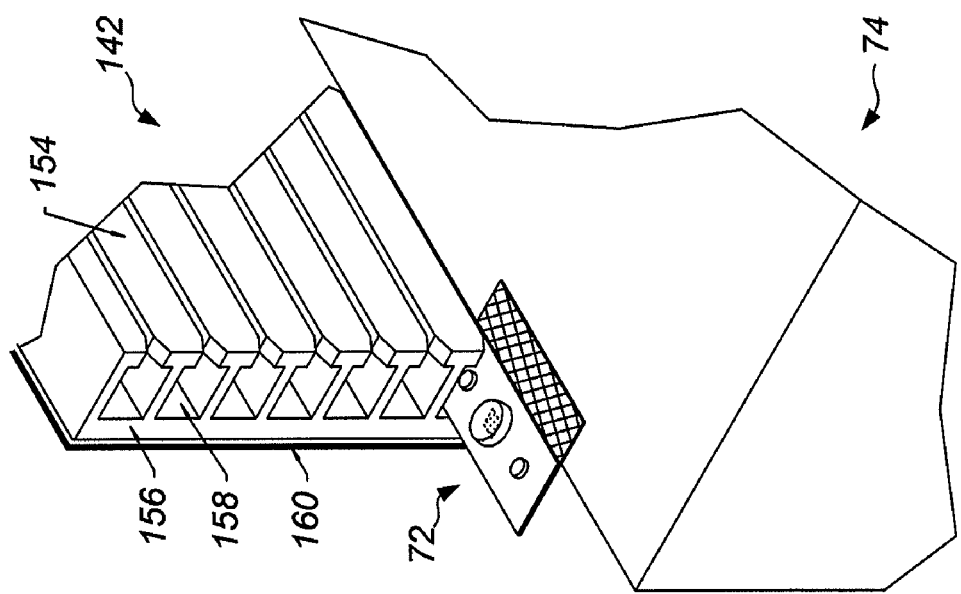
Figure 12A:
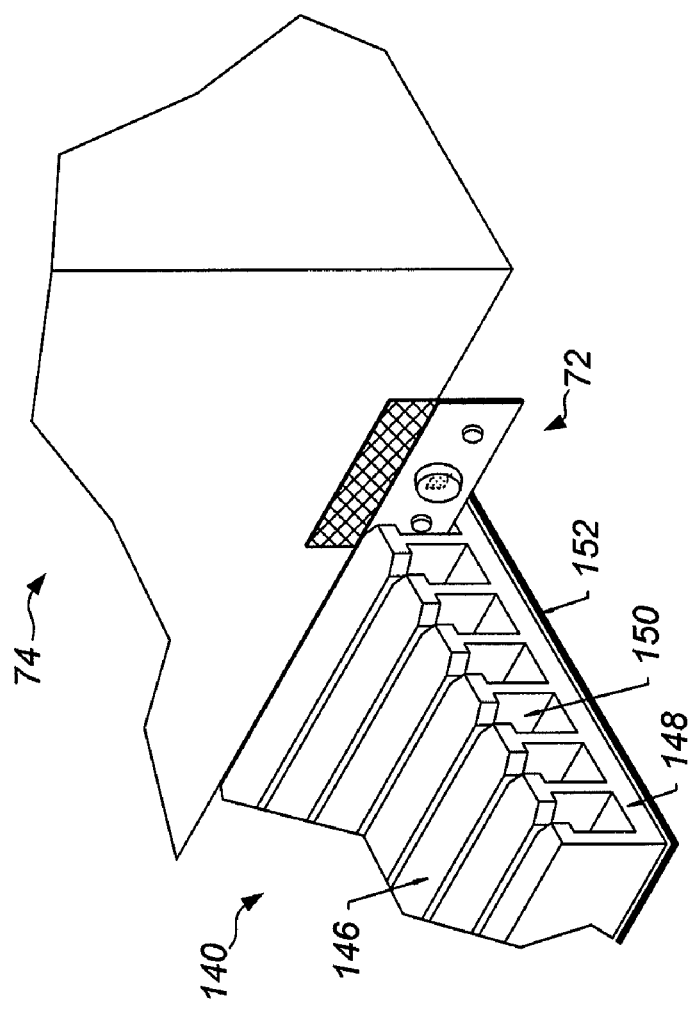
Figure 12B:
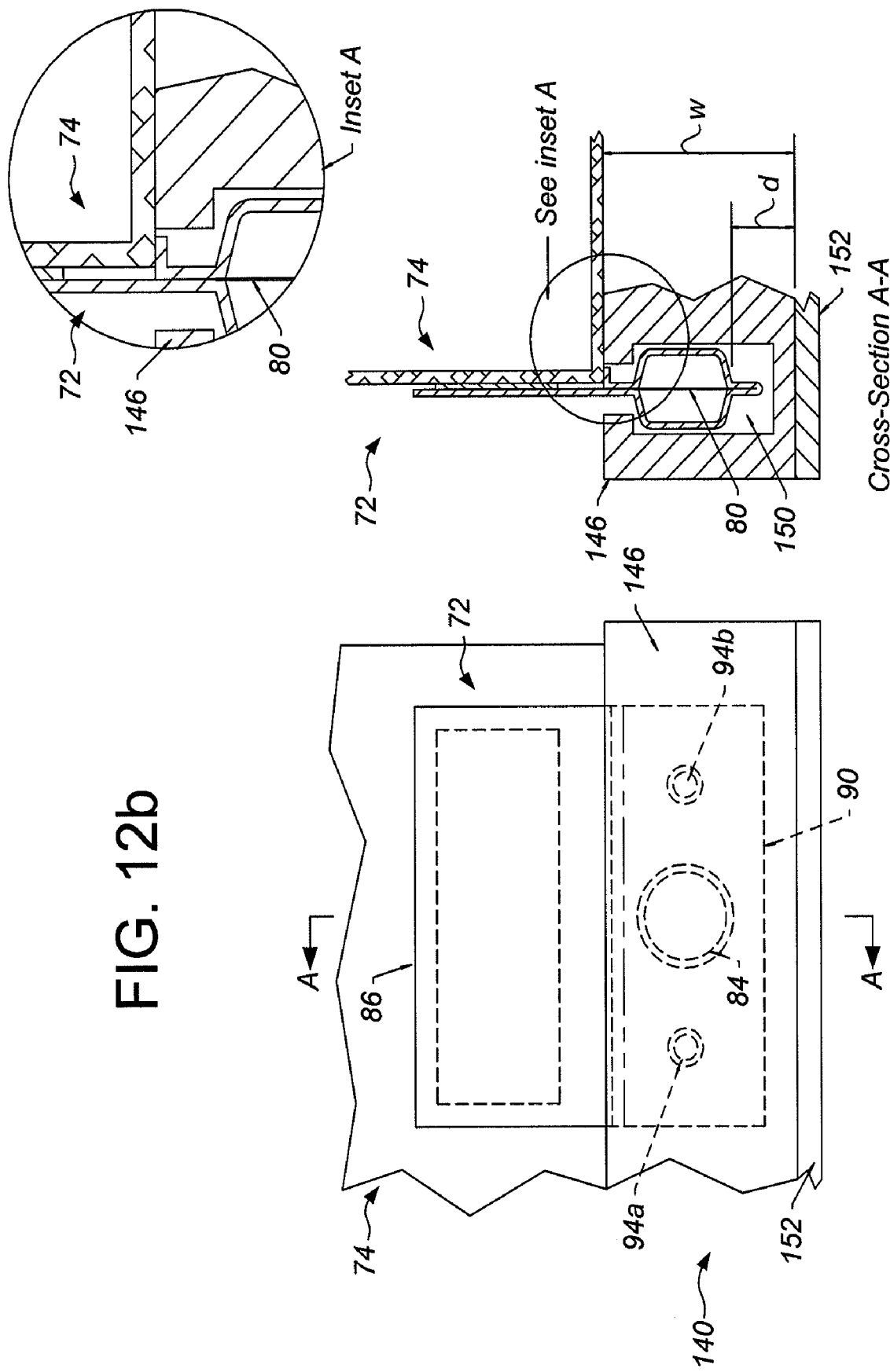

Referring now to FIGS. 12a and 12b (at times collectively referred to as "FIG. 12"), FIG. 13 and FIGS. 14a and 14b (at times collectively referred to as "FIG. 14"), the carriage of other exemplary embodiments of the present invention may be in the form of a fixtured shelf 140 (FIG. 12), fixtured side panel 142 (FIG. 13) or fixtured hanger 144 (FIG. 14). As shown in FIG. 12, the fixtured shelf of one exemplary embodiment may replace or sit atop a shelf of a shelving unit (not shown) that may carry one or more packages (as shown, a box 74) and affixed RFID carrier (as shown, RFID carrier 72). The fixtured shelf may include a number of columns 146 (support structure) (e.g., T-shaped columns) that extend from a base 148, the columns being separated from one another to thereby define a number of crevices or openings 150 therebetween. In this regard, the columns may form a surface capable of carrying one or more packages (the packages being capable of resting on the surface), and capable of carrying the package(s) such that their affixed RFID carrier(s) at least partially extend into the openings therebetween.

As also shown, the fixtured shelf 140 may further include an antenna 152, which may be configured for electrical coupling to an RFID reader (not shown). The antenna may be affixed to the base 148 of the fixtured shelf, which as indicated, may replace or sit atop of a shelf of a shelving unit. In this regard, the columns 146 and base may be sized and positioned such that when the RFID carriers and affixed products are carried by the fixtured shelf, the respective RFID tags have may be ensured at least a predetermined distance from the antenna; the RFID carriers may therefore ensure placement of the RFID tag in a desirable read position for the respective RFID reader.

The fixtured side panel 142 of FIG. 13 may be configured similar to the fixtured shelf 140 of FIG. 12. That is, the fixtured side panel may include a number of columns 154 (support structure) (e.g., T-shaped columns) that extend from a base 156, the columns being separated from one another to thereby define a number of crevices or openings 158 therebetween. In this regard, the columns may form a surface against which one or more packages may be placed or otherwise rest such that their affixed RFID carrier(s) at least partially extend into the openings therebetween. In this regard, the side panel may replace or sit atop a back or side wall of a shelving unit (not shown) perpendicular to shelves of the shelving unit that may carry one or more package (e.g., a box 74) and affixed RFID carrier (e.g., RFID carrier 72).

Also similar to the fixtured shelf 140 of FIG. 12, the fixtured side panel 142 of FIG. 13 may further include an antenna 160, which may be configured for electrical coupling to an RFID reader (not shown). The antenna may be affixed to the base 148 of the fixtured side panel. The columns 154 and base may therefore be sized and positioned such that when the RFID carriers and affixed products rest against the fixtured side panel, the respective RFID tags have may be ensured at least a predetermined distance from the antenna; the RFID carriers may therefore ensure placement of the RFID tag in a desirable read position for the respective RFID reader.

The fixtured hanger 144 of FIG. 13 may be configured similar to the fixtured shelf 140 of FIG. 12 and fixtured side panel 142 of FIG. 13. That is, the fixtured hanger may include a number of columns 162 (support structure) (e.g., T-shaped columns) that extend from a base 164, the columns being separated from one another to thereby define a number of crevices or openings 166 therebetween. In the embodiment of FIG. 13, the columns may form a number of hanging structures from which one or more packages (e.g., a box 74) may be suspended, such as by extending their affixed RFID carrier(s) (e.g., RFID carrier 72) at least partially into the openings therebetween.

Also similar to the fixtured shelf 140 of FIG. 12 and the fixtured side panel 142 of FIG. 13, the fixtured hanger 144 may further include an antenna 168, which may be configured for electrical coupling to an RFID reader (not shown). The antenna may be affixed to the base 164 of the fixtured hanger. The columns 162 and base may therefore be sized and positioned such that when the RFID carriers and affixed products are suspended from the fixtured hanger, the respective RFID tags have may be ensured at least a predetermined distance from the antenna; the RFID carriers may therefore ensure placement of the RFID tag in a desirable read position for the respective RFID reader.

Other aspects of exemplary embodiments of the present invention provide a method of storing one or more products. According to one exemplary embodiment, and with reference to FIG. 15, a method may include affixing an RFID carrier 10, 38, 60, 72 to a product, as shown at block 170. The method may then include positioning the RFID carrier and affixed product relative to a carriage 94, 102, 108, 112, 122, 140, 142 configured to support the RFID carrier and affixed product, as shown at block 172. The RFID carrier includes an affixed RF transponder tag 22, 48, 64, 80 at a designated location on the RFID carrier, and the carriage includes an RF antenna separate from the RF transponder tag. In this regard, the RFID carrier and carriage may be configured such that, when the carrier and affixed product are positioned relative to the carriage, the RF transponder tag has approximately at least a (first) predetermined spatial relationship with the antenna.

Many modifications and other embodiments of the invention will come to mind to one skilled in the art to which this invention pertains having the benefit of the teachings presented in the foregoing descriptions and the associated drawings. In this regard, it should be understood that the components (e.g., fastener, first positioning feature, second positioning feature, etc.) of exemplary embodiments of the present invention may be mixed and matched in any of a number of different manners to form yet other embodiments of the present invention. For example, the RFID carrier 10 of FIG. 1 may include a fastener such as the snap retainer shown and described with respect to FIG. 2, or the clip 68 shown and described with reference to FIG. 3. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
    a body including a radio frequency (RF) transponder tag, or marker for directing inclusion of an RF transponder tag, at a designated location on the body;
    a fastener configured to affix the body to a product including a container for holding a volume of fluid, the fastener being configured to affix the body to the product such that the apparatus projects out from the container;
    a first positioning feature for supporting the body, RF transponder tag and affixed product relative to a support structure located proximate an RF antenna, the first positioning feature being shaped, sized or positioned such that, in an instance in which the body, RF transponder tag and affixed product are supported relative to the support structure, the RF transponder tag has approximately at least a first predetermined spatial relationship with the RF antenna; and
    a second positioning feature comprising a projection that projects out from the body, the second positioning feature being shaped, sized or positioned such that, in an instance in which the body, RF transponder tag and affixed product are supported relative to the support structure proximate another RF transponder tag, the RF transponder tag has approximately at least a second predetermined spatial relationship with the other RF transponder tag.

2. An apparatus according to claim 1, wherein the first positioning feature comprises an opening defined by the body for suspending the body, RF transponder tag and affixed product from the support structure comprising a hanging structure.

3. An apparatus according to claim 1, wherein the body comprises first and second portions one or both of which includes a projection, the first and second portions being foldable upon one another such that the projection at least partially encases the RF transponder tag.

4. An apparatus according to claim 3, wherein the first and second portions of the body respectively include an indention and projection, and wherein the first and second portions being foldable upon one another such that the projection is extendable at least partially into the indention, the indention being configured to hold the projection in place.

5. An apparatus according to claim 1, wherein the fastener comprises an adhesive tab, the adhesive tab being separable from the body.

6. An apparatus according to claim 1, wherein the product includes a carrier defining an opening, and
    wherein the fastener comprises a retainer having a pair of tabs respectively including an indentation and projection, the tabs being configured to extend on opposing sides of the carrier such that the projection is extendable through the opening of the carrier and at least partially into the indention.

7. An apparatus according to claim 1, wherein the product includes a carrier defining an opening, and
    wherein the fastener is configured to affix the body to a product such that the opening defined by the body is at least partially aligned with the opening defined by the carrier.

8. An apparatus according to claim 1, wherein the first predetermined spatial relationship is selected to ensure that, in an instance in which the body, RF transponder tag and affixed product are supported relative to the support structure, the RF transponder tag is within a read field of the RF antenna.

9. An apparatus according to claim 1, wherein the container includes a bag for holding the volume of fluid.

10. An apparatus according to claim 1, wherein the second predetermined spatial relationship is selected to ensure that, in an instance in which the body, RF transponder tag and affixed product are supported relative to the support structure proximate another RF transponder tag, mutual coupling between the RF transponder tag and other RF transponder tag is effectively eliminated.

11. An apparatus comprising:
a support structure configured to support a carrier having a product affixed to the carrier, the product including a container for holding a volume of fluid, the carrier having the product affixed to the carrier such that the carrier projects out from the container, the support structure comprising a hanging structure, the carrier defining an opening for suspending the carrier from the hanging structure, the carrier having a radio frequency (RF) transponder tag;
an RF antenna separate from the RF transponder tag; and
a mount to which the support structure and antenna are affixed,
wherein the support structure is further configured such that, in an instance in which the carrier, RF transponder tag and affixed product are suspended from the hanging structure, the RF transponder tag has approximately at least a predetermined spatial relationship with the RF antenna, and
wherein the carrier further includes a projection that is shaped, sized or positioned such that, in an instance in which another carrier including another RF transponder tag and affixed product is suspended from the hanging structure, the RF transponder tag has approximately at least a second predetermined spatial relationship with the other RF transponder tag.

12. An apparatus according to claim 11, wherein the support structure and antenna are integrated.

13. An apparatus according to claim 11, wherein the mount is mountable at a storage location of the product affixed to the carrier.

14. An apparatus according to claim 11, wherein the support structure is configured to support a plurality of carriers and respective, affixed products, and
wherein the support structure is configured such that, in an instance in which the carriers, RF transponder tags and respective, affixed products are supported by the support structure, the RF transponder tags of the carriers each have approximately the same predetermined spatial relationship with the RF antenna.

15. An apparatus according to claim 11, wherein the predetermined spatial relationship is selected to ensure that, in an instance in which the body, RF transponder tag and affixed product are supported relative to the support structure, the RF transponder tag is within a read field of the RF antenna.

16. An apparatus according to claim 11, wherein the container includes a bag for holding the volume of fluid.

17. A method comprising:
affixing a carrier to a product including a container for holding a volume of fluid, the carrier being affixed to the product such that the carrier projects out from the container, wherein the carrier comprises:
a body including a radio frequency (RF) transponder tag at a designated location on the body;
a fastener for affixing the body to the product;
a positioning feature for supporting the body, RF transponder tag and affixed product relative to a support structure located proximate an RF antenna; and
a projection that projects out from the body; and
supporting the carrier and affixed product relative to a support structure of a carriage configured to support the carrier, RF transponder tag and affixed product, the carriage including an RF antenna separate from the RF transponder tag,
wherein the carrier and affixed product are supported relative to the support structure by the positioning feature, the positioning feature being shaped, sized or positioned such that, as the carrier and affixed product are supported relative to the support structure, the RF transponder tag has approximately at least a first predetermined spatial relationship with the RF antenna, and
wherein the projection is shaped, sized or positioned such that, in an instance in which another carrier including another RF transponder tag and affixed product is supported relative to the support structure, the RF transponder tag has approximately at least a second predetermined spatial relationship with the other RF transponder tag.

18. A method according to claim 17, wherein the positioning feature comprises an opening defined by the body, and the support structure comprises a hanging structure, and
wherein supporting the carrier, RF transponder tag and affixed product comprises suspending the carrier, RF transponder tag and affixed product by the opening from the hanging structure.

19. A method according to claim 17, wherein affixing a carrier comprises affixing a plurality of carriers to a plurality of respective products, and
wherein supporting the carrier, RF transponder tag and affixed product comprises supporting the carriers, RF transponder tags and respective, affixed products relative to the carriage such that, as the carriers and affixed products are supported relative to the support structure, the RF transponder tags of the carriers each have approximately the same first predetermined spatial relationship with the RF antenna.

20. A method according to claim 19, wherein the projections of the respective carriers are shaped, sized or positioned such that, as the carriers and affixed products are supported relative to the support structure, each RF transponder tag has approximately at least a second predetermined spatial relationship with an adjacent RF transponder tag.

21. A method according to claim 20, wherein the second predetermined spatial relationship is selected to ensure that, as the carriers and affixed products are supported relative to the support structure, mutual coupling between the RF transponder tags is effectively eliminated.

22. A method according to claim 17, wherein the first predetermined spatial relationship is selected to ensure that, as the carrier and affixed product are supported relative to the support structure, the RF transponder tag is within a read field of the RF antenna.

23. A method according to claim 17, wherein the container includes a bag for holding the volume of fluid.

* * * * *